United States Patent
Sato

(10) Patent No.: US 10,457,068 B2
(45) Date of Patent: Oct. 29, 2019

(54) IMAGE PROCESSING APPARATUS CONFIGURED TO TRAPPING PROCESS AND NON-TRANSITORY COMPUTER-READABLE RECORDING MEDIUM STORING INSTRUCTIONS FOR IMAGE PROCESSING INCLUDING TRAPPING PROCESS

(71) Applicant: Brother Kogyo Kabushiki Kaisha, Nagoya-shi, Aichi-ken (JP)

(72) Inventor: Yuji Sato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/938,523

(22) Filed: Mar. 28, 2018

(65) Prior Publication Data

US 2019/0061373 A1 Feb. 28, 2019

(30) Foreign Application Priority Data

Aug. 30, 2017 (JP) ................. 2017-165653

(51) Int. Cl.
*G06K 9/00* (2006.01)
*G06K 15/02* (2006.01)
(Continued)

(52) U.S. Cl.
CPC ............... *B41J 2/525* (2013.01); *H04N 1/58* (2013.01); *H04N 1/60* (2013.01)

(58) Field of Classification Search
CPC ........ H04N 1/58; H04N 1/60; G06K 15/1822; G06K 15/1877; G06K 15/02
See application file for complete search history.

(56) References Cited

U.S. PATENT DOCUMENTS 8,400,684 B2 * 3/2013 Kawano ............... G06K 15/02
358/3.26
2010/0259775 A1 * 10/2010 Sakamoto ............ H04N 1/58
358/1.9
(Continued)

FOREIGN PATENT DOCUMENTS

JP 2010-245965 A 10/2010
JP 2012-165245 A 8/2012
JP 5699655 B2 4/2015

*Primary Examiner* — Benny Q Tieu
*Assistant Examiner* — Juan M Guillermety
(74) *Attorney, Agent, or Firm* — Banner & Witcoff, Ltd.

(57) ABSTRACT

In an image processing apparatus, a controller sequentially selects a plurality color determination pixels within a determination area, determine whether the color determination pixel has a chromatic color, whether a first pixel adjacent to the color determination pixel is black, and determine whether a second pixel apart from the color determination pixel by one pixel. The controller determines that a first trapping process is to be executed when the color determination pixel has a chromatic color and the first pixel is black, and a second trapping process when the color determination pixel has a chromatic color, the second pixel is black, and the intermediate pixels located between the color determination pixel and the second pixel are black. Thereafter, the controller executes a first trapping process and a second trapping process, but restricts the second trapping process to the pixel on which the first trapping process is to be executed.

15 Claims, 15 Drawing Sheets

(51) Int. Cl.
  *H04N 1/00*   (2006.01)
  *B41J 2/525*  (2006.01)
  *H04N 1/60*   (2006.01)
  *H04N 1/58*   (2006.01)

(56) References Cited

U.S. PATENT DOCUMENTS

| | | | |
|---|---|---|---|
| 2011/0128556 A1* | 6/2011 | Eguchi | G06K 15/02 358/1.2 |
| 2012/0327479 A1* | 12/2012 | Komatsu | H04N 1/58 358/1.9 |
| 2015/0213340 A1* | 7/2015 | Tanaka | H04N 1/4092 358/1.2 |
| 2017/0331982 A1* | 11/2017 | Henmi | H04N 1/00748 |

* cited by examiner

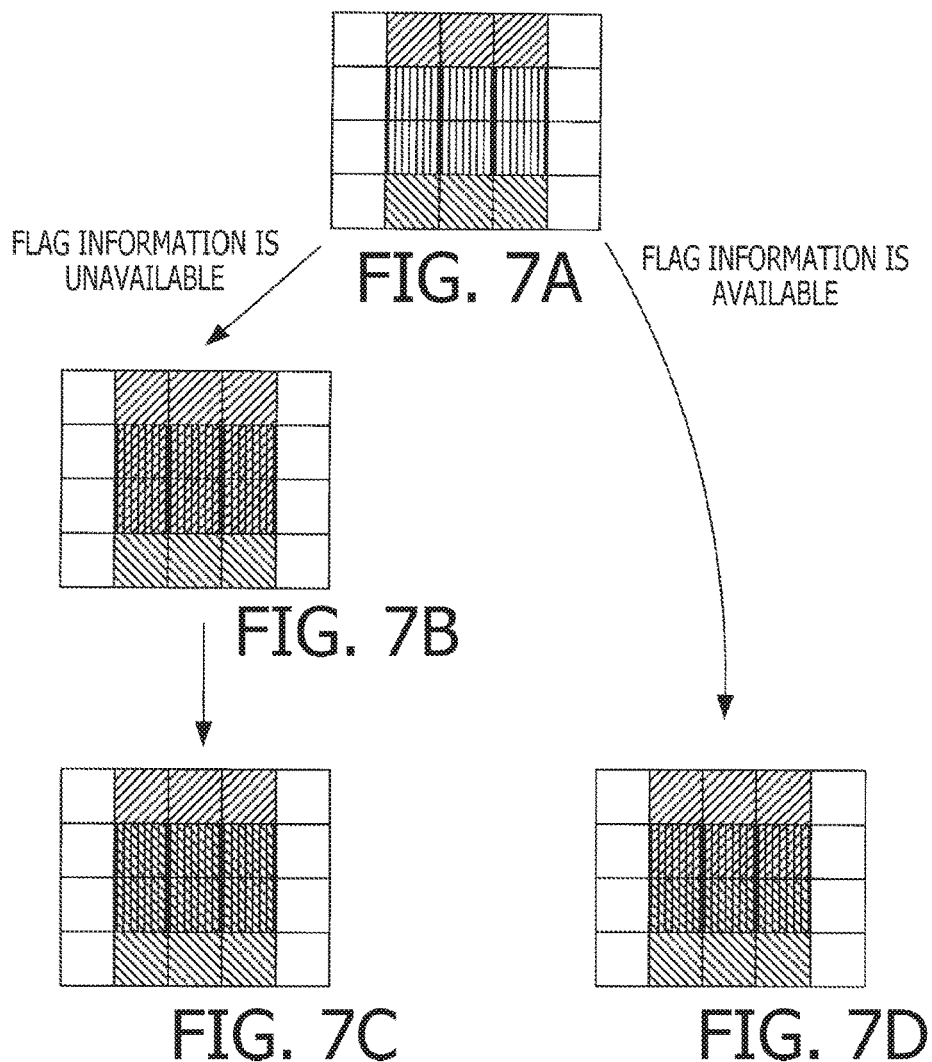

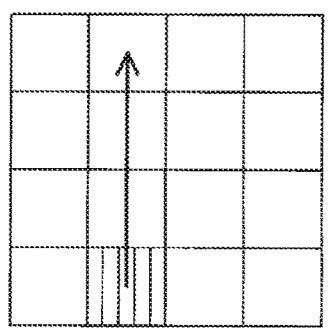
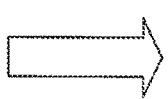
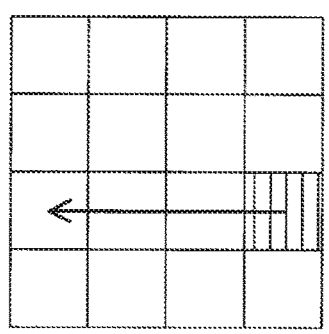
FIG. 15A  FIG. 15B
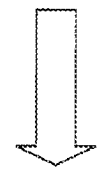
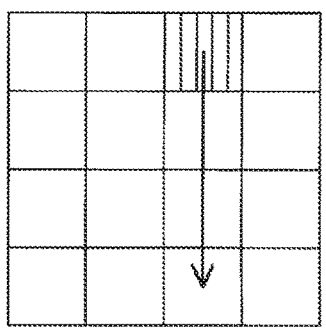
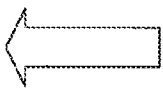
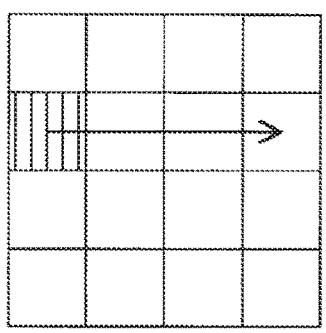
FIG. 15D  FIG. 15C

IMAGE PROCESSING APPARATUS CONFIGURED TO TRAPPING PROCESS AND NON-TRANSITORY COMPUTER-READABLE RECORDING MEDIUM STORING INSTRUCTIONS FOR IMAGE PROCESSING INCLUDING TRAPPING PROCESS

CROSS-REFERENCE TO RELATED APPLICATIONS

This application claims priority under 35 U.S.C. § 119 from Japanese Patent Application No. 2017-165653 filed on Aug. 30, 2017. The entire subject matter of the application is incorporated herein by reference.

BACKGROUND

Technical Field

The present disclosures relate to an image processing apparatus, and a non-transitory computer-readable recording medium storing instructions causing the image processing apparatus to execute image processing.

Related Art

Conventionally, there has been known an image for apparatus configured to form a color image by overlaying a plurality of different color images. An example of such an image forming apparatus is a color laser printer, which is configured such that cyan, magenta, yellow and black toner images are formed on an image carrier in an overlaid manner so that a color image is formed on the sheet.

In the image forming apparatus as mentioned above, if positional errors occur on the image carrier among the overlaid toner images, a so-called void, which is a phenomenon that a base of the sheet is partially exposed may occur. In order to suppress the void, the image forming apparatus typically employs a trapping process. By executing the trapping process, to black pixels in an area where the void may occur, color components of pixels adjacent to the black pixels and having chromatic color components are added.

SUMMARY

An example of a conventional image processing apparatus is configured to determine whether the void would occur using a 5×5 pixel window. Specifically, the conventional image processing apparatus is configured to select a pixel arranged at a center of the 5×5 pixel window as a pixel of interest, and determines whether the pixel of interest represents a black color. When the pixel of interest represents the black color, the image processing apparatus further determines whether the color represented by the pixel of interest is denser (higher) than a particular density, and whether there is a boundary between black pixels, which are pixels representing black, and chromatic color pixels, which are pixels representing chromatic colors other than black, to determine whether the void would occur. The 5×5 window is used to determine whether the boundary mentioned above exists between the pixel of interest arranged at the center of the 5×5 window and pixels adjacent to the pixel of interest, and between the pixels adjacent to the pixel of interest and pixels apart from the pixel of interest by one pixel.

According to the method of determining whether the void would occur with use of the 5×5 window, however, a buffer for storing approximately five lines of pixel data is necessary. It is preferable that areas in which the void would occur are determined efficiently and the trapping process can be executed appropriately. That is, it is desired that an improved technique according to which the window size and the buffer size can be suppressed and further the trapping process can be executed more appropriately than the conventional image processing apparatus described above is presented.

According to aspects of the present disclosures, there is provided an image processing apparatus, having a storage configured to store image data, and a controller. The controller is configured to execute receiving image data configured such that a plurality of pixel arrays each including a plurality of pixels are arranged in a main scanning direction, the plurality of pixel arrays being aligned in a sub scanning direction which is perpendicular to the main scanning direction, setting a determination area having a particular number of pixels within a particular area of three lines or more in the sub scanning direction and three pixels or more in the main scanning direction, sequentially selecting a plurality of pixels within the determination area as color determination pixels, determining whether the color determination pixel as selected has a chromatic color, determining black pixels which includes (1) determining whether a first pixel adjacent to the color determination pixel is black, and (2) determining whether a second pixel apart from the color determination pixel with one or more intermediate pixel therebetween is black, determining execution of trapping processes, which includes (1) determining that a first trapping process to add a color component of the color determination pixel to the first pixel is to be executed when the controller determines that the color determination pixel has a chromatic color and the first pixel is black, and (2) determining that a second trapping process to add the color component of the color determination pixel to the second pixel is to be executed when it is determined that the color determination pixel has a chromatic color, the second pixel is black, and the intermediate pixels located between the color determination pixel and the second pixel are black, executing trapping processes which includes (1) executing the first trapping process on a pixel on which the first trapping process is determined to be executed, and (2) executing the second trapping process on a pixel on which the second trapping process is determined to be executed, restricting execution of trapping processes which includes restricting execution of the second trapping process on the pixel on which the first trapping process is determined to be executed. A position of the second pixel within the determination area varies depending on the color determination pixel.

According to aspects of the present disclosures, there is provided an image processing apparatus, having a buffer configured to temporarily store image data, and a controller. The controller is configured to execute receiving image data configured such that a plurality of pixel arrays each including a plurality of pixels are arranged in a main scanning direction, the plurality of pixel arrays being aligned in a sub scanning direction which is perpendicular to the main scanning direction, setting, in the image data, an area including three or more lines of pixels aligned in a sub scanning direction, each line includes a particular number, which is three or more, of pixels aligned in a main scanning direction as a determination area, sequentially selecting a plurality of pixels within the determination area as color determination pixels, determining, referring to the buffer, whether the color determination pixel as selected has a chromatic color, determining, referring to the buffer, black pixels including (1) determining whether a first pixel adjacent to the color determination pixel is black, and (2) determining whether a second pixel apart from the color determination pixel with one or more intermediate pixel therebetween is black, determining execution of trapping processes including (1) determining that a first trapping process to add a color component of the color determination pixel to the first pixel is to be executed when the controller determines that the color determination pixel has a chromatic color and the first pixel is black, and (2) determining that a second trapping process to add the color component of the color determination pixel to the second pixel is to be executed when it is determined that the color determination pixel has a chromatic color, the second pixel is black, and the intermediate pixels located between the color determination pixel and the second pixel are black, executing trapping processes including (1) executing the first trapping process on a pixel on which the first trapping process is determined to be executed and (2) executing the second trapping process on a pixel on which the second trapping process is determined to be executed, restricting execution of trapping processes including restricting execution of the second trapping process on the pixel on which the first trapping process is determined to be executed. A position of the second pixel within the determination area varies depending on the color determination pixel. The setting updates the determination area by setting a plurality of areas of the image data as the determination area sequentially in accordance with reception of the image data. The buffer includes an area buffer having a buffer size corresponding to the determination area, the area buffer storing image data of pixel group within the determination area set by the setting among a plurality of pixels the image data has, a plurality of line buffers the number of which is less than the number of lines by one, the plurality of line buffers storing image data of a pixel group outside the determination area among the plurality of pixels the image data has and supposed to be set as the determination area again when the determination area is updated by the setting. A position of the second pixel in the determination area varies depending on the color determination pixel as selected.

According to aspects of the disclosures, there is provided a non-transitory computer-readable recording medium storing instructions to control an image processing apparatus having a storage configured to store image data and a controller. The instructions cause, when executed by the controller, the image processing apparatus to execute receiving image data configured such that a plurality of pixel arrays each including a plurality of pixels are arranged in a main scanning direction, the plurality of pixel arrays being aligned in a sub scanning direction which is perpendicular to the main scanning direction, setting a determination area having a particular number of pixels within a particular area of three lines or more in the sub scanning direction and three pixels or more in the main scanning direction, sequentially selecting a plurality of pixels within the determination area as color determination pixels, determining whether the color determination pixel as selected has a chromatic color, determining whether a first pixel adjacent to the color determination pixel is black, determining whether a second pixel apart from the color determination pixel with one or more intermediate pixel therebetween is black, determining that a first trapping process to add a color component of the color determination pixel to the first pixel is to be executed when the controller determines that the color determination pixel has a chromatic color and the first pixel is black, determining that a second trapping process to add the color component of the color determination pixel to the second pixel is to be executed when it is determined that the color determination pixel has a chromatic color, the second pixel is black, and the intermediate pixels located between the color determination pixel and the second pixel are black, executing the first trapping process on a pixel on which the first trapping process is determined to be executed, and executing the second trapping process on a pixel on which the second trapping process is determined to be executed, restricting execution of the second trapping process on the pixel on which the first trapping process is determined to be executed. A position of the second pixel within the determination area varies depending on the color determination pixel.

BRIEF DESCRIPTION OF THE ACCOMPANYING DRAWINGS

FIGS. 7A-7D show different results of the trapping process depending on availability of flag information.

FIG. 8 illustrates priority of the trapping process based on color determination pixels.

FIGS. 15A-15D illustrate a selection operation of process objective pixels according to the third illustrative embodiment.

DETAILED DESCRIPTION OF THE EMBODIMENTS

Hereinafter, referring to the accompanying drawings, embodiments of the present disclosures will be described.

[First Embodiment]

Figure 1:
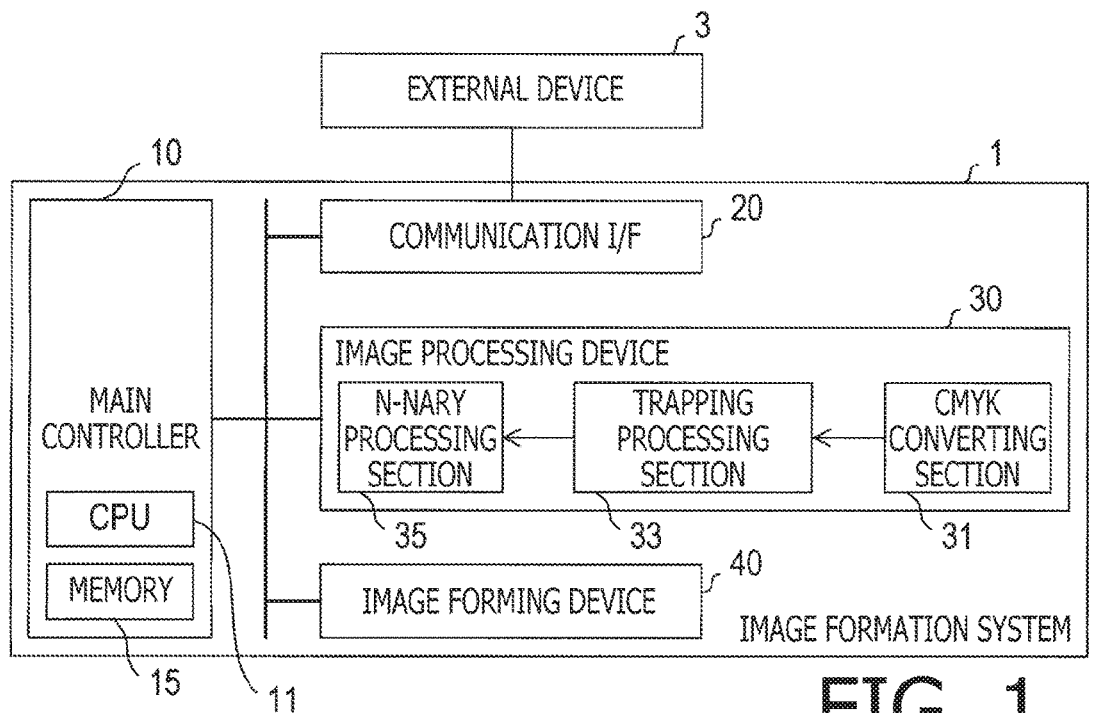
FIG. 1 is a block diagram illustrating a configuration of an image formation system according to an illustrative embodiment.

FIG. 1 shows a block diagram of an image formation system 1 according to a first embodiment. The image formation system 1 is configured to form an image on a sheet based on image data transmitted from an external device 3.

The image formation system 1 includes a main controller 10, a communication I/F 20, an image processing device 30, and an image forming device 40.

The main controller 10 has a CPU 11 and a memory 15, and integrally controls the image formation system 1. The memory 15 includes a ROM, a RAM and an NVRAM (not shown). Functions of the main controller 10 is at least partially realized as the CPU 11 executes processes in accordance with programs stored in the memory 15.

The communication 20 is capable of communicating with the external device 3. Image data transmitted from the external device 3 is input to the main controller 10 through the communication I/F 20.

The main controller 10 inputs the image data received from the external device 3 to the image processing device 30. The image processing device 30 converts the image data input from the main controller 10 to image data for printing (hereinafter, occasionally referred to as print data). The main controller 10 inputs the print data obtained from the image processing device 30 to the image forming device 40 to cause the image forming device 40 to print a color image based on the print data.

The image forming device 40 is configured to form a color image based on the print data by overlaying a plurality of color component images. In this regard, the image forming device 40 is a laser printer configured to form, for example, cyan (C), magenta (M), yellow (Y) and black (K) toner images on an image carrier in an overlaid manner to form a single color image on the sheet. The image carrier may be a sheet or an intermediate transfer belt. In the following description, the colors of cyan, magenta, yellow and black will occasionally be represented by upper cases C, M, Y and K, respectively.

The image processing device 30 is provided with an CMYK converting section 31, a trapping processing section 33 and an N-nary processing section 35 to convert the image data transmitted from the main controller 10 to the print data (i.e., the image data for printing).

The image data input to the image processing device 30 from the main controller 10 is an RGB image data. The RGB image data is configured such that each pixel value is represented by brightness values of R (red), C (green) and B (blue) components. The CMYK converting section 31 is configured to convert the RGB image data input from the main controller 10 to CMYK image data.

The CMYK image data is configured such that each pixel value is represented by densities of the C (cyan), M (magenta), Y (yellow) and K (black) components. In the following description, a C-value means the density of a cyan component (cyan density), an M-value means the density of a magenta component (magenta density), a Y-value means the density of a yellow component (yellow density) and a K-value means the density of a black component (black density). Further, a CMY-value represents a combination of densities of the cyan, magenta and yellow components.

The trapping processing section 33 is configured to execute a trapping process on the CMYK image data. The trapping process is executed to suppress a void which occurs due to positional errors among a plurality of color component images when a plurality of colors of images are overlaid to form a color image on the sheet.

The N-nary processing section 35 is configured to make the CMYK image data on which the trapping process is executed to N-nary data. The image processing device 30 is configured to input the N-nary CMYK image data to the main controller 10 as the print data.

The trapping processing section 33 will be described in detail, referring to FIG. 2. The trapping processing section 33 has a processor 50 and a buffer 60. The processor 50 is configured to execute a trapping control process, which will be described in detail later (see FIG. 4), by hardware and/or software. The trapping control process includes a process of finding pixels on which the trapping process is to be executed, and a process of executing the trapping process on the pixels as found. The processor 50 may be configured by a dedicated circuit, or may include the CPU 51 and the memory 53. The processor 50 may be configured such that the CPU 51 executes the trapping control process in accordance with a program stored in the memory 53.

The buffer 60 is configured to store data necessary for executing the trapping control process. According to the present embodiment, pixels on which the trapping process is to be executed are found with use of a 3×3 pixel determination area (which is a rectangular area defined by 3-pixel length in a main scanning direction and 3-pixel length in a sub scanning direction), and the trapping process is executed on the pixels found in the 3×3 pixel determination area. The determination area will also be referred to as a window (i.e., the 3×3 pixel determination area will also be referred to as a 3×3 pixel window).

The image data transmitted from the CMYK converting section 31 to the trapping processing section 33 has pixel data arrays. Specifically, the image data includes pixel arrays each of which includes a plurality of pixels linearly arranged in the main scanning direction that is parallel to respective lines, the pixel arrays being aligned in a sub scanning direction which is perpendicular to the main scanning direction in accordance with an aligning order.

Therefore, the buffer 60 includes an area buffers 61 for storing image data within the 3×3 pixel determination area, and line buffers 63 corresponding to a plurality of lines (according to the embodiment, there are two lines) for storing pixels rearranged within the determination area. It is noted that arrows indicated in FIG. 2 represents flow of image data. Circled symbols A and B indicate connection between the area buffer 61 and the line buffers 63. That is, it can be considered that indicated routes between the area buffer 61 and the line buffers 63 assigned with the same symbols are connected with each other.

Figure 2:
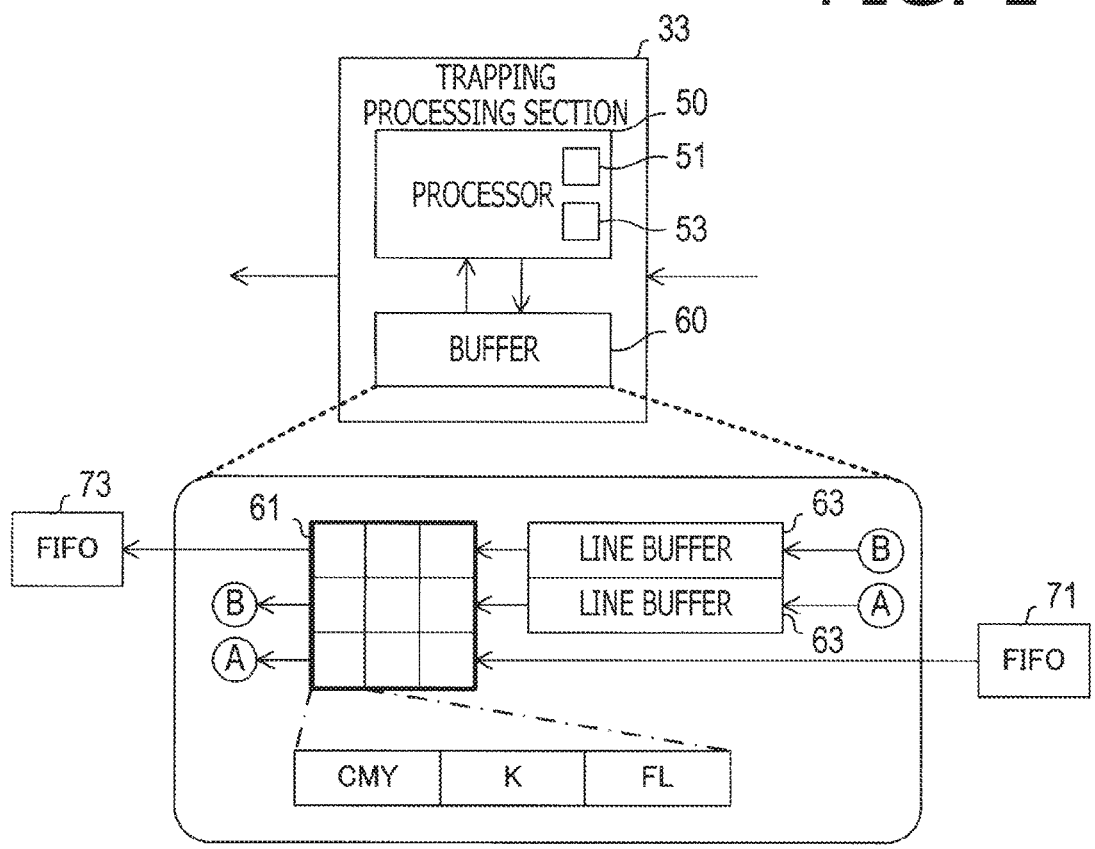
FIG. 2 is a block diagram illustrating a configuration of a trapping processing section.

As shown in FIG. 2, the area buffer 61 and the line buffers 63 have an area for storing the CMYK-value of the image data and FL-value which represent flag information for each pixel. The FL-value represents execution history of the trapping process on each pixel.

In the area buffer 61, the pixel data of the latest line is transmitted from the CMYK section 31, and the pixel data for one-line before the latest line, and two-line before the latest line is received from the line buffers 63.

Figure 3A:
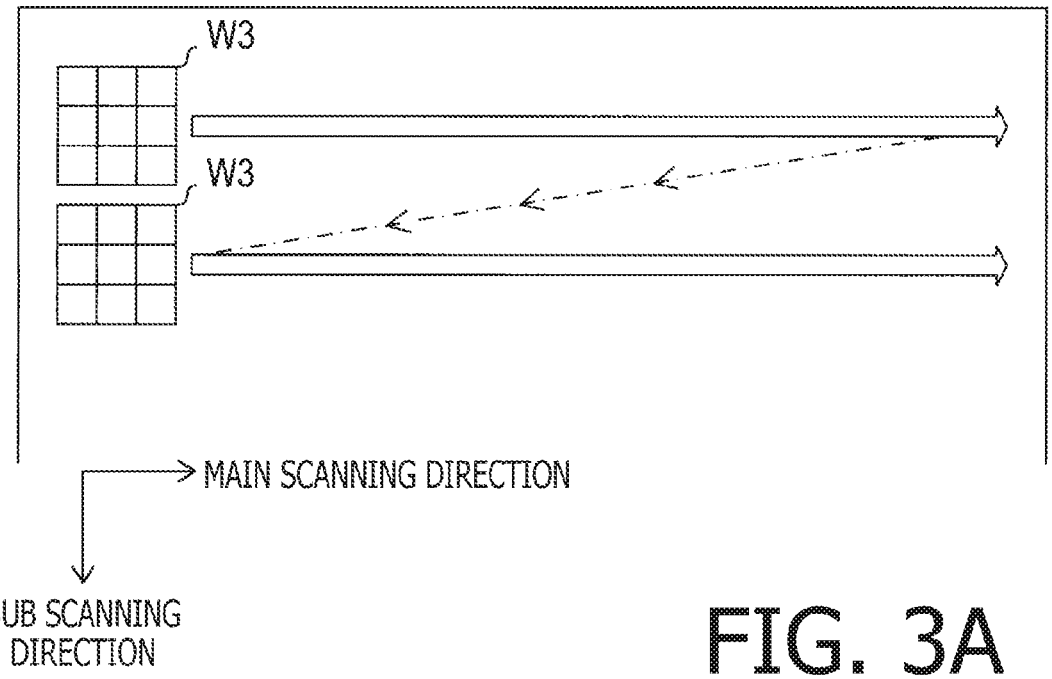
FIG. 3A illustrates change of determination areas.

That is, as shown in FIG. 3A, the trapping processing section 33 is configured to move the determination area W3 on the image represented by the image data, from an end to the other on each line in the main scanning direction, and move the determination area W3 in the sub scanning direction on a line basis in the sub scanning direction, 3×3 the entire image data is set to the 3×3 pixel determination areas W3 and execute the trapping process.

Figure 3B:
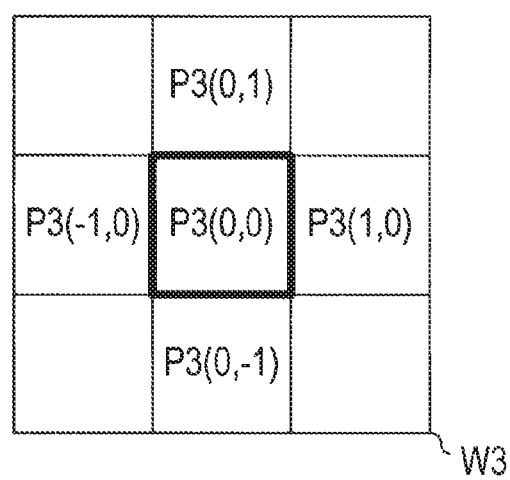
FIG. 3B illustrates a determination area of 3×3 pixels.

In the following description, marks as shown in FIG. 3B are assigned to the central pixel and pixels adjacent to the central pixel within the 3×3 pixels in the determination areas W3. Referring to thus assigned marks, a particular pixel will be designated in the following description. According to FIG. 3B, a mark P3(0, 0) is assigned to the central pixel which is a central part surrounded by thick lines. To a pixel adjacent to the central pixel and arranged on an upper side thereof, a mark P3(0, 1) is assigned, and to a pixel adjacent to the central pixel and arranged on a lower side thereof, a mark P3(0, −1) is assigned. Further, to a pixel adjacent to the central pixel and arranged on a right side thereof, a mark P3(1, 0) is assigned, and to a pixel adjacent to the central pixel and arranged on a left side thereof, a mark P3(−1, 0) is assigned. It is noted that, in the above description and the following description, an up-down direction corresponds to the sub scanning direction, and a right-left direction corresponds to the main scanning direction.

Figure 4:
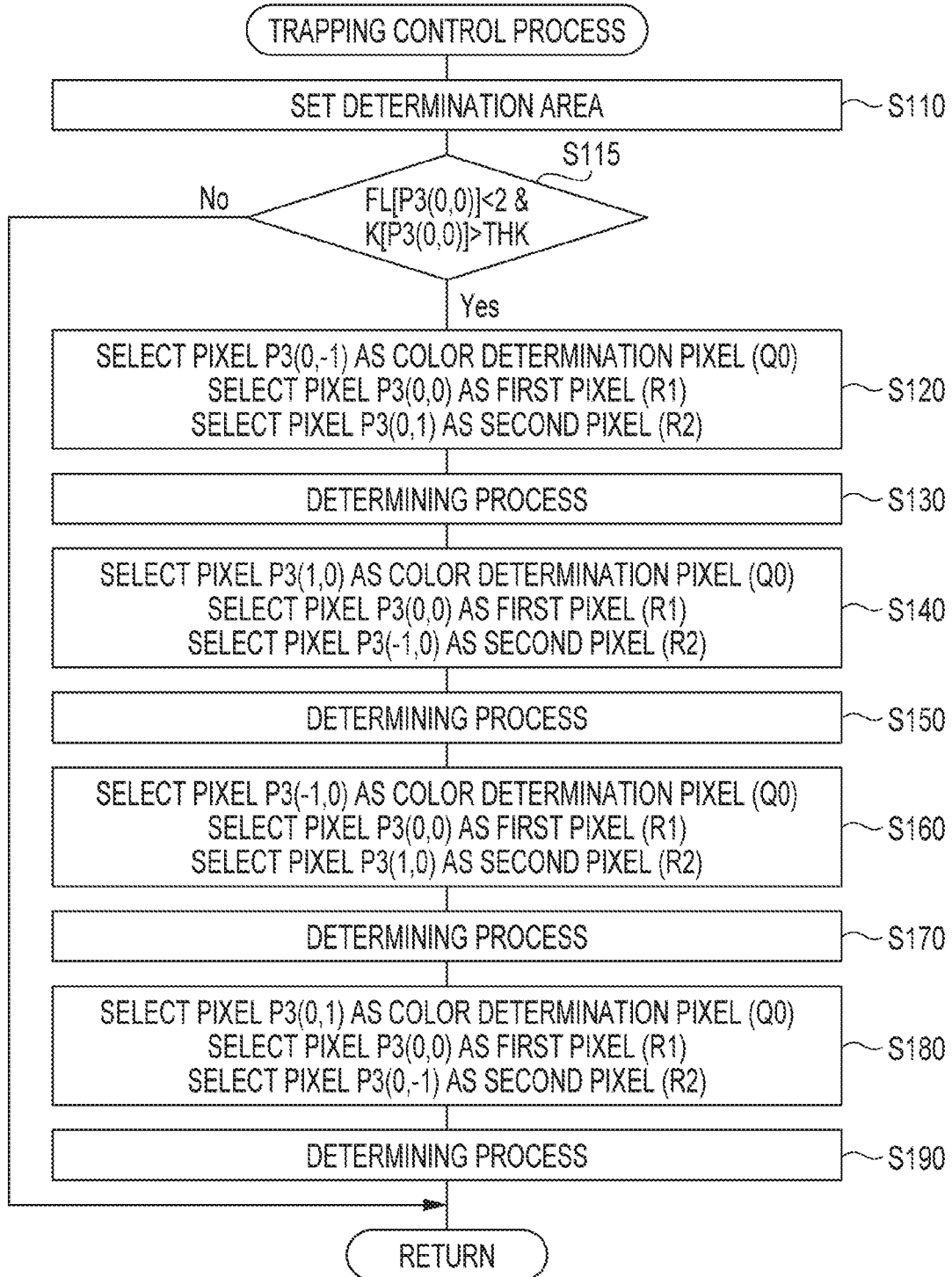
FIG. 4 is a flowchart illustrating a trapping control process executed by a processor according to the illustrative embodiment.

The processor 50 repeatedly executes the trapping control process shown in FIG. 4 to sequentially set the determination area W3 as the 3×3 pixel block over the entire image data, and executes the trapping process.

When the trapping control process is started, the processor 50 sets one determination area W3 (S110). A setting operation of the determination area W3 includes an operation of changing a storage position of the pixel data in the area buffer 61 and the line buffers 63 by one pixel, and an operation of storing the pixel data for one pixel from a FIFO buffer 71 (see FIG. 2) positioned on an upstream, in relation to the trapping processing section 33, of data flow of the image data to the area buffer 61. By the above operation, from the area buffer 61, the pixel data on the most downstream side in the data flow of the image data in the area buffer 61 and the line buffers 63 is output to the FIFO 73 on a downstream in relation to the trapping processing section 33.

It is noted that the FIFO buffer 71 may be regarded to be built in the CYMK converting section 31, or may be regarded to be arranged between the CYK converting section 31 and the trapping processing section 33. Further, the FIFO buffer 73 may be regarded to be built in the N-nary processing section 35, or may be positioned between the trapping processing section 33 and the N-nary processing section 35.

By the setting operation in S110, a location of the determination area W3 is updated, in comparison with a location before the setting operation, to a location moved by one pixel on the image represented by the image data (see FIG. 3A).

After the determination area W3 is set in S110, the processor 50 determines whether the FL-value and the K-value of the central pixel P3(0, 0) in the determination area W3 satisfy the following conditions (S115). That condition is (1) the FL-value is less than two, and (2) the K-value is larger than a threshold THK.

The threshold THK is used to determine whether the corresponding pixel is a black pixel or not. According to the present embodiment, when the K-value is larger than the threshold value THK, the pixel is determined to be the black pixel.

According to the present embodiment, the FL-value is one of zero, one and two. An initial value of the FL-value is zero. When the trapping process has not been executed on the corresponding pixel, the FL-value is zero. The FL-value is reset to the initial value when the trapping control process for the image data is started, for a unit of image data. When the trapping process has been executed on the corresponding pixel, the FL-value is set to one or two. When the trapping process has been executed on the corresponding pixel which is regarded as a first pixel (R1) adjacent to a color determination pixel (Q0) as will be described later, the FL-value of the corresponding pixel is set to two. When the trapping process has been executed on the corresponding pixel which is regarded as a second pixel (R2) apart from the color determination pixel (Q0) by one pixel, the FL-value of the corresponding pixel is set to one.

Figure 6:
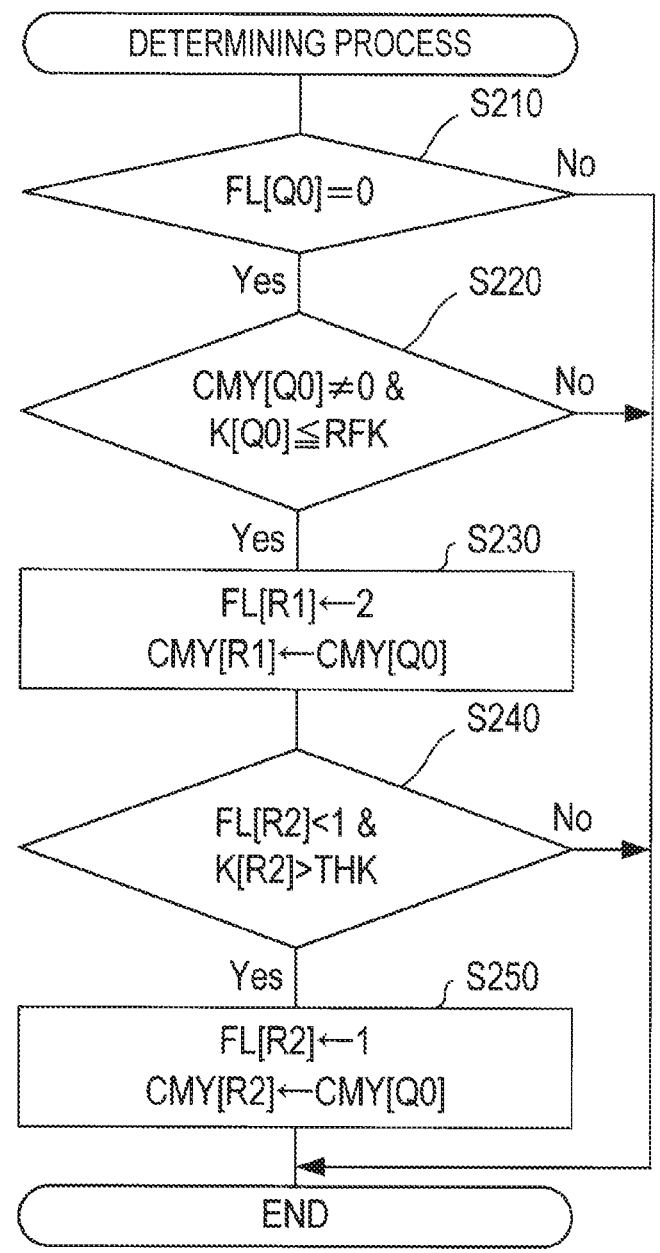
FIG. 6 is a flowchart illustrating a determining process executed by the processor.

An indication FL[xx] in FIGS. 4 and 6 means the FL-value of the pixel designated by [xx]. For example, the FL[P3(0, 0)] means the FL-value of the pixel P3(0, 0), and FL[Q0] means the FL-value of the color determination pixel (Q0). Similarly, an indication K[xx] means the K-value of the pixel designated by the [xx], and CMY[xx] means the CMY-value of the pixel designated by [xx]. Accordingly, K[P3(0, 0)] means the K-value of the pixel P3(0, 0), and K[Q0] means the K-value of the color determination pixel (Q0). Similarly, CMY[Q0] means the CMY-value of the color determination pixel (Q0).

As shown in FIG. 4, when the FL-value is less than two and the K-value is larger than the threshold value THK (i.e., FL[P3(0, 0)]<2, and K[P3(0, 0)]>THK), the processor 50 makes an affirmative decision (S115: YES), or otherwise the processor 50 makes a negative decision (S115: NO).

When the processor 50 makes the negative decision in S115, the processor 50 terminates the trapping control process for the determination area W3 set in S110. When the processor 50 makes the affirmative decision (S115: YES), the processor 50 executes steps S120 onwards to execute a particular process regarding the determination area W3 set in S110.

In S120, the processor 50 selects the pixel P3(0, −1) as the color determination pixel (Q0), the pixel P3 (0, 0) as the first pixel (R1), and the pixel P3 (0, 1) as the second pixel (R2).

Figure 5A:
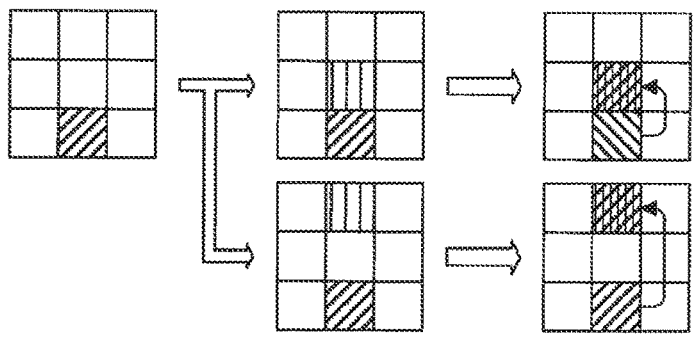
FIGS. 5A-5D illustrate the trapping process in the 3×3 pixel determination area.

The color determination pixel (Q0) selected in S120 corresponds to a pixel hatched by oblique lines extending from the upper right to the lower left in FIG. 5A. The first pixel (R1) corresponds to a pixel hatched by straight lines extending in the up-down direction in an upper stage of FIG. 5A. The second pixel (R2) corresponds to a pixel hatched by straight lines extending in the up-down direction in a lower stage of FIG. 5A.

After the selection in S120, the processor 50 executes a determining process (S130) to execute the trapping process on the first pixel (R1) which is the black pixel. Further, when the second pixel (R2) is the black pixel, the processor 50 further executes the trapping process on the second pixel (R2). The first pixel (R1) on which the trapping process has been executed is hatched, in a right side area of the upper stage of FIG. 5A, by an overlaid pattern of the oblique lines and the straight lines. Similarly, the second pixel (R2) on which the trapping process has been executed is hatched, in the right side area of the lower stage of FIG. 5A, by the overlaid pattern of the oblique lines and the straight lines.

Concretely, the processor 50 is capable of executing a determining process shown in FIG. 6 (S130). In the determining process, the processor 50 determines whether the FL-value of the color determination pixel (Q0) is zero (S210). When the FL-value of the color determination pixel (Q0) is zero, the trapping process has riot been executed on the color determination pixel (Q0).

When the processor 50 determines that the FL-value of the color determination pixel (Q0) is not zero (S210: NO), the processor 50 terminates the determining process. When the processor 50 determines that the FL-value of the color determination pixel (Q0) is zero (S210: YES), the processor 50 determines whether the CYM-value and the K-value of the color determination pixel (Q0) satisfy the following conditions. The conditions include (1) the CMY-value of the color determining pixel (Q0) is not zero, and (2) the K-value of the color determining pixel (Q0) is equal to or less than a reference value RFK. The reference value RFK is used to determine whether the color determination pixel (Q0) is the black pixel or riot.

The processor 50 makes an affirmative decision in S220 when the CMY-value of the color determination pixel (Q0) is not zero, and the K-value of the color determination pixel (Q0) is equal to or less than the reference value RFK (i.e., CMY[Q0]≠0, and K[Q0]≤RFK), otherwise the processor 50 makes a negative decision (S220: NO). When the CMY-value is not zero, at least one of the C-value, M-value, and Y-value is not zero. When the processor 50 makes the affirmative decision in S220, the color determination pixel (Q0) has a chromatic color other than black.

When the processor 50 makes the negative decision (S220: NO), the processor 50 terminates the determining process. When the processor 50 makes the affirmative decision (S220: YES), the processor 50 executes the trapping process to be executed on the first pixel (R1). That is, the processor 50 replaces the CMY-value of the first pixel (R1) with the CMY-value of the color determination pixel (Q0) to add the color components of the color determination pixel (Q0) to the first pixel (R1). In S230, the processor 50 further makes the FL-value of the first pixel (R1) be updated to two.

According to the present embodiment, the first pixel (R1) is always the central pixel P3(0, 0). Further, the determining process shown in FIG. 6 is executed only when the central pixel P3(0, 0) is determined to be the black pixel (S115: YES). Therefore, the trapping process executed in S230 corresponds to a first trapping process for the first pixel (R1), which is the black pixel, adjacent to the color determination pixel (Q0) of the chromatic color.

After execution of S230, the processor 50 determines whether the FL-value and the K-value of the second pixel (R2) satisfy the following conditions (S240). The conditions include (1) the FL-value of the second pixel (R2) is less than one, and (2) the K-value of the second pixel (R2) is larger than the threshold value THK.

The processor 50 makes an affirmative decision in S240 when the FL-value is less than one and the K-value is larger than the threshold value THK (i.e., FL[R2]<1, and [R2]>THK), or otherwise makes a negative decision.

When the processor 50 makes the negative decision (S240: NO), the processor 50 terminates the determining process. When the processor 50 makes the affirmative, decision (S240: YES), the processor 50 executes the trapping process on the second pixel (R2) in S250. That is, the processor 50 replaces the CMY-value of the second pixel (R2) with the CMY-value of the color determination pixel (Q0) to add the color components of the color determination pixel (Q0) to the second pixel (R2). This trapping process corresponds to a second trapping process for the second pixel (R2) which is a black pixel, sandwiching, in association with the color determination pixel (Q0) which is the chromatic color pixel, the intermediate pixel (first pixel (R1)) which is the black pixel.

In S250, the processor 50 makes the FL-value of the second pixel (R2) be updated to one. Thereafter, the processor 50 terminates the determining process. As above, the processor 50 determines, in the determining process (S130), necessity of the trapping process for the first pixel (R1) adjacent to the color determination pixel (Q0), and for the second pixel (R2) which, in association with the color determination pixel (Q0), sandwiches the first pixel (R1) based on one color determination pixel (Q0) within the determination area W3, and executes the trapping process as needed.

When the processor 50 terminates the determining process of S130, the processor 50 newly selects the color determination pixel (Q0) (FIG. 4, S140). Concretely, the processor 50 selects a pixel P3(1, 0) as the color determining pixel (Q0), a pixel P3(0, 0) as the first pixel (R1) and a pixel. P3(−1, 0) as the second pixel (R2).

Figure 5B:
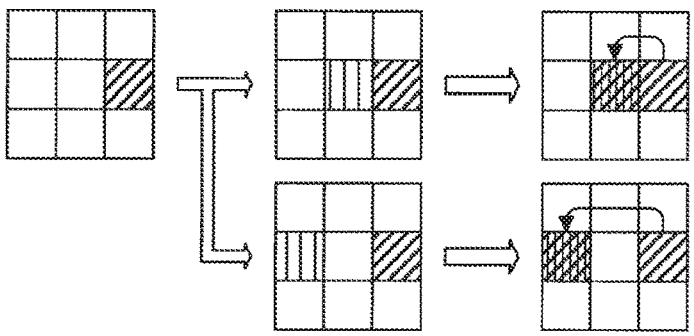

The color determination pixel (Q0) selected in S140 corresponding to a pixel hatched by oblique lines extending from the upper right to the lower left in FIG. 5B. The first pixel (R1) corresponds to a pixel hatched by straight lines extending in the up-down direction in an upper stage of FIG. 5B. The second pixel (R2) corresponds to a pixel hatched by straight lines extending the up-down direction in a lower stage of FIG. 5B.

After the selection in S140, the processor 50 executes the determining process shown in FIG. 6 (S150). In S150, the process same as in S130 are executed on the color determination pixel (Q0), the first pixel (R1) and the second pixel (R2) selected in S140.

As in the determining process in S130, the first pixel (R1) is the central pixel P3(0, 0). Therefore, by the trapping process in S150, the CMY-value of the central pixel P3(0, 0) is updated to the CMY-value of the color determining pixel (Q0) selected in 140. In FIG. 5B, similar to FIG. 5A, the first pixel (R1) on which the trapping process has been executed in the determining process in S150 is indicated in a right area of the upper stage of FIG. 5B, and the second pixel (R2) on which the trapping process has been executed is indicated in a right area of the lower stage of FIG. 5B.

Figure 5C:
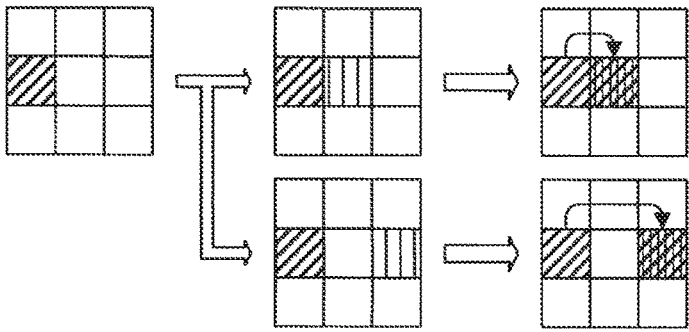

When the processor 50 terminates the determining process in S150, the processor 50 selects a pixel P3(−1, 0) as the color determination pixel (Q0), a pixel P3(0, 0) as the first pixel (R1) and a pixel P3(1, 0) as the second pixel (R2) in S160. FIG. 5C shows the color determination pixel (Q0), the first pixel (R1) and the second pixel (R2) selected in S160 are indicated in a manner same as in FIGS. 5A and 5B.

After the selection in S160, the processor 50 executes the determining process shown in FIG. 6 (S170). In S170, for the color determination pixel (Q0), the first pixel (R1) and the second pixel (R2) selected in S160, the determining process same as the process executed in S130 is executed. Then, in a manner similar to FIGS. 5A and 5B, the first pixel (R1) on which the trapping process is executed in the determining process in S170 is indicated on a right area of an upper stage of FIG. 5C, and the second pixel (R2) on which the trapping process has been executed is indicated on a right area of a lower stage of FIG. 5C.

Figure 5D:
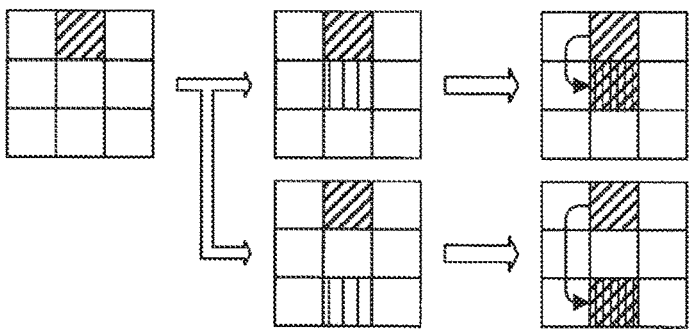

When the processor 50 terminates the determining process of S170, the processor 50 selects the pixel P3(0, 1) as the color determination pixel (Q0), the pixel P3(0, 0) as the first pixel (R1) and the pixel P3(0, −1) as the second pixel (R2) (S180). FIG. 5D shows the color determination pixel (Q0), the first pixel (R1) and the second pixel (R2) in a manner similar to FIGS. 5A and 5B.

After the selection in S180, the processor 50 executes the determining process shown in FIG. 6 (S190). In S190, on the color determination pixel (Q0), the first pixel (R1) and the second pixel (R2) selected in S180, the determining process same as the process executed in S130 is executed. Then, in a manner similar to FIGS. 5A and 5B, the first pixel (R1) on which the trapping process is executed in the determining process in S190 is indicated on a right area of an upper stage of FIG. 5D, and the second pixel (R2) on which the trapping process has been executed is indicated on a right area of a lower stage of FIG. 5D.

When the determining process in S190 is terminated, the processor 50 terminates the trapping control process with respect to the determination area W3 set in S110. Thereafter, the processor 50 newly starts the trapping control process, searches for pixels on which the trapping process should be executed within the determination area set in S110, and executes the trapping process on the pixel which requires the trapping process.

According to the image formation system 1 described above, although the trapping process searches for the pixel on which the trapping process is to be executed, and the trapping process is executed on the pixel as searched within the 3×3 pixel area, the trapping process can be executed on the second pixel (R2) apart from the color determination pixel (Q0) by one pixel, as in a conventional method in which the trapping process is executed using a 5×5 pixel window.

It is because the image formation system 1 according to the present embodiment is configured to sequentially select a plurality of surrounding pixels adjacent to the central pixel P3(0, 0) within the determination area W3 (i.e., the four surrounding pixels P3(0, −1), P3(1, 0), P3(−1, 0) and P3(0, 1)) as the color determination pixel (Q0), and execute the trapping process on the first pixel (R1) adjacent to the color determination pixel (Q0), and an the second pixel (R2) apart from the color determination pixel (Q0) by one pixel.

If the processes regarding the trapping are executed using the 5×5 pixel window as in a conventional method, it would be necessary to provide an area buffer for 5×5 pixel and line buffers for four lines of pixels in the buffer 60. In contrast, according to the present embodiment, by providing the 3×3 pixel area buffer 61 and two lines of the line buffers 63 within the buffer 60, processes equivalent to the conventional processes can be executed. Therefore, according to the present embodiment, with suppressing the buffer size, the trapping process can be executed efficiently.

Further, according to the present embodiment, by employing the FL-value which is flag information, execution of the second trapping process for the pixel on which the first trapping process has been executed is restricted, even if the size of the determination area W3 has been changed from the conventional 5×5 pixel window to the 3×3 pixel window, the trapping process can be executed appropriately.

As described above, the first trapping process corresponds to the trapping process for the first pixel (R1), and the second trapping process corresponds to the trapping process for the second pixel (R2). According to the present embodiment, the number of the color determination pixel (Q0) is not limited to one within the determination area W3, and one pixel can be set to be either the first pixel (R1) or the second pixel (R2).

If the flag information is not used, there could be a case where, on one pixel, the first trapping process is executed, and thereafter, the second trapping process is also executed. If such overwriting by the trapping processes is permitted and if the chromatic color pixels and the black pixels are arranged as shown in an upper stage of FIG. 7, a biased trapping process would be executed.

In the upper stage of FIG. 7, pixels hatched by oblique lines represent the pixels having chromatic colors other than black, different directions of the oblique lines indicating different chromatic colors. Further, in the upper stage of FIG. 7, pixels hatched by straight lines extend the up-down direction represent the black pixels on which the trapping process is to be executed. Thus, the upper stage of FIG. 7 shows an image in which there are two areas having different chromatic colors with sandwiching the black area.

If the trapping control process is executed on the image data as above without using the flag information, the trapping process is executed on the black area with using the color components of the chromatic color pixels located above the black pixels, and then the processed pixels are entirely subject to the trapping process again using the color components of the chromatic color pixels located below the processed pixels as shown in a left area of FIG. 7.

In contrast, when the flag information is used as in the present embodiment, the trapping process is executed on the black pixels based on the color components of the chromatic color pixels located above the black pixels, and then, another trapping process is executed on only a lower part of the black pixels, on which the trapping process has been executed, based on the color components of the chromatic color pixels located below the black pixels.

It is because the second trapping process (S250) is not executed on the pixels on which the first trapping process has been executed (S230) and the FL-values have been updated to two (S240: NO).

Therefore, according to the present embodiment, the trapping process can be appropriately executed on a black area surrounded by different color areas, and an image having an excellent quality can be formed on the sheet with suppressing the void. It is noted that, according to the present embodiment, the FL-value is one of zero, one and two, but the FL-value could be limited to be either zero or one. That is, the FL-value explained to be two in the above-described embodiment may be regarded to be one. When the range of the FL-value is limited to zero or one, a necessary size of the buffer 60 to store the FL-value can also be suppressed. Even if the FL-value is limited to zero or one, the image formation system 1 according to the present embodiment achieves the same function as in a case where the range of the FL-value is not limited. Therefore, according to aspects of the present embodiment, even art necessary capacity to store the flag information can be suppressed.

Further, according to the present embodiment, the order of priority of the pixels on which the trapping process is executed is managed by selecting a plurality of surrounding pixels adjacent to the central pixel P3(0, 0) in a particular order as the color determination pixel (Q0) and then executing the trapping process. Therefore, even though a relatively small-sized determination area is used, a highly uniform trapping process can be executed at a boundary between the chromatic color pixels and the black pixels.

In FIG. 8, in regard to the trapping process, the order of priority for the surrounding pixels with respect to a single chromatic color pixel (i.e., the color determination pixel) is indicated by numbers. The smaller the number in FIG. 8 is, the higher the priority for the pixel on which the trapping process is executed is. According to FIG. 8, the order of priority is continuously lowered from a lower left pixel to an upper right pixel.

[Second Embodiment]

A configuration of an image formation system 1 according to a second embodiment is substantially the same as that of the first embodiment except a part of the configuration. Therefore, in the following description, the same reference numbers are assigned to structures and components of the second embodiment which are the same as those of the first embodiment, and descriptions thereof will be omitted. Therefore, configurations/components of the second embodiment which will not be mentioned in the following description should be understood to be the same as those of the first embodiment.

Figure 9A:
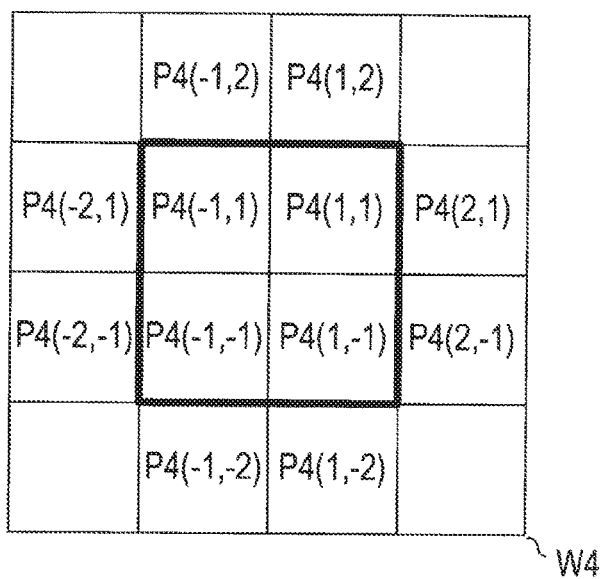
FIG. 9A illustrates a 4×4 pixel area.

The image formation system 1 according to the second embodiment is configured to execute the trapping process with use of a 4×4 pixel determination area W4 as shown in FIG. 9A.

Since the 4×4 pixel determination area W4 is used, the buffer 60 is provided with an area buffer 65 for the 4×4 pixel window and three lines of line buffers 67. The area buffer 65 is provided instead of the 3×3 pixel area buffer 61 employed in the first embodiment. Further, the three lines of line buffers 57 are employed instead of the two lines of line buffers 63 employed in the first embodiment.

Figure 9B:
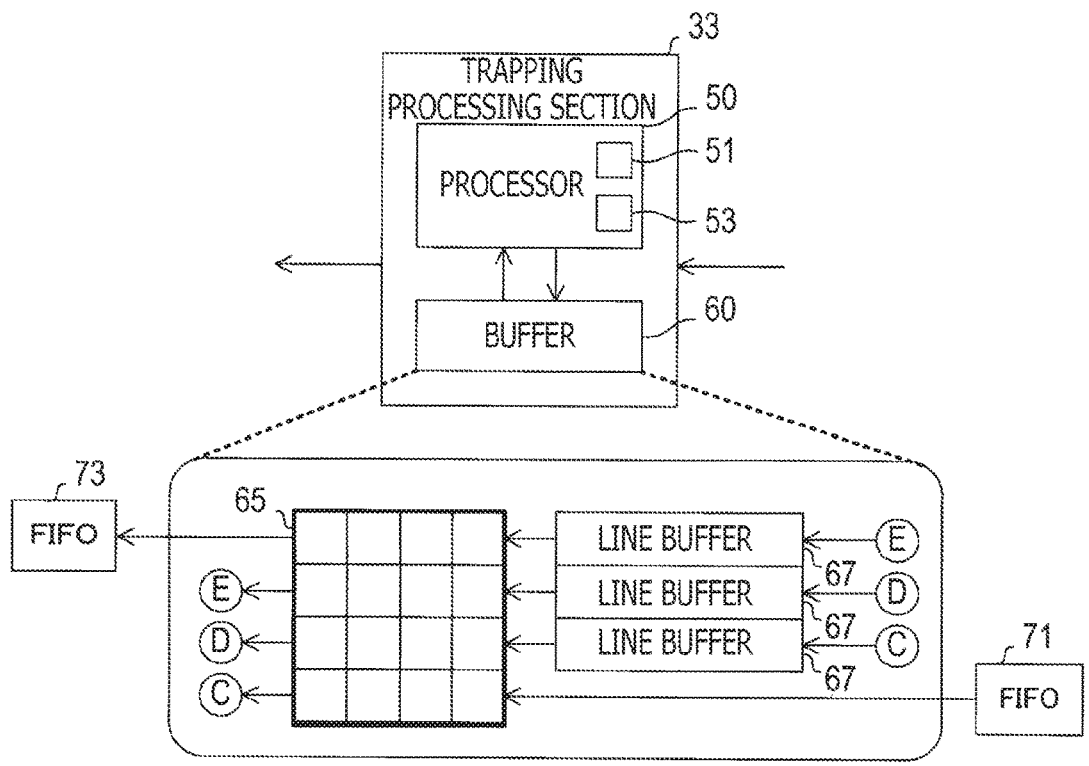
FIG. 9B is a block diagram illustrating a configuration of the trapping process section according to a second illustrative embodiment.

The area buffer 65 and the line buffers 67 are configured, similarly to the first embodiment, to have areas storing the CMYK-values and the FL-values for respective pixels (see FIG. 2). Arrows shown in FIG. 9B indicate, similarly to the first embodiment, flow of the image data, and marks C, D and E represent connection between the area buffer 65 and the line buffers 67. That is, portions of the area buffer 65 and the line buffers 76 to which the same marks C, D and E are assigned are considered to be connected with each other.

In the following description, among the 4×4 pixels included in the determination area W4, to central pixels and surrounding pixels, marks as shown in FIG. 9A are assigned. In the following description, particular pixels are designated with use of the marks shown in FIG. 9A. According to FIG. 9A, to four central pixels framed by thick lines, marks P4(1, 1), P4(1, −1), P4(−1, 1) and P4(−1, −1) are assigned, respectively. It is noted that the up-down direction in FIG. 9A corresponds to the sub scanning direction, and the right-left direction of FIG. 9A corresponds to the main scanning direction.

To surrounding pixels adjacent to the pixels P4(−1, 1) and P4(1, 1) on the upper side thereof, marks P4(−1, 2) and P4(1, 2) are assigned, respectively. To surrounding pixels adjacent to the pixels P4(−1, −1) and P4(1, −1) on the lower side thereof, marks P4(−1, −2) and P4(1, −2) are assigned, respectively.

To surrounding pixels adjacent to the pixels P4(1, 1) and P4(1, −1) on the right side thereof, marks P4(2, 1) and P4(2, −1) are assigned, respectively. To surrounding pixels adjacent to the pixels P4(−1, 1) and P4(−1, −1) on the left side thereof, marks P4(−2, 1) and P4(−2, −1) are assigned, respectively.

Figure 10:
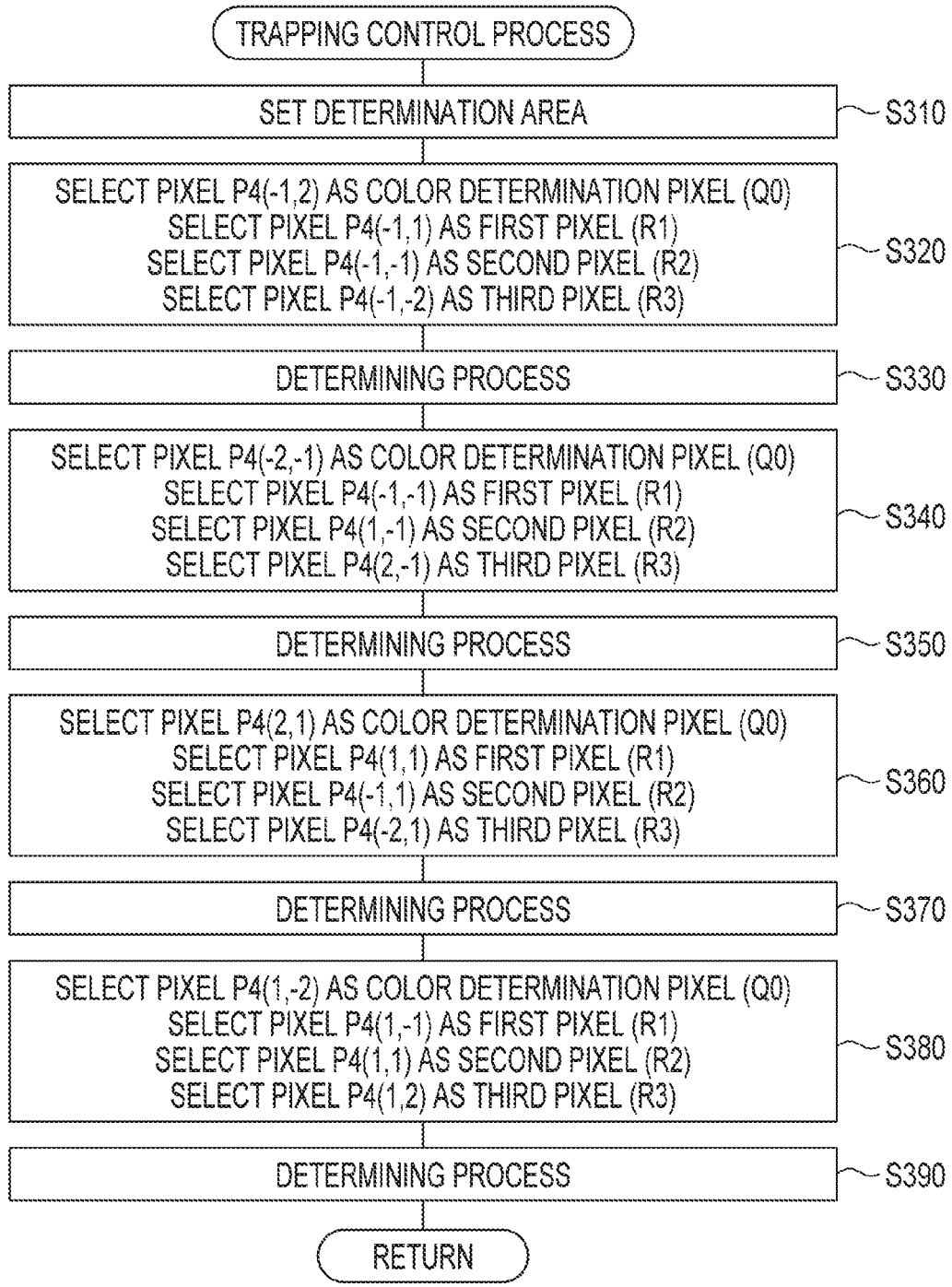
FIG. 10 is a flowchart illustrating the trapping control process executed by the processor according to the second illustrative embodiment.

The processor 50 according to the present embodiment is configured to execute a trapping control process shown in FIG. 10 instead of the trapping control process shown in FIG. 4 repeatedly to sequentially set 4×4 pixel determination area W4 over entire image data and executes the trapping process.

When the trapping control process is started, the processor 50 sets the determination area W4 (S310). An operation to set the determination area W4 is the same as that of the first embodiment. By the setting operation in S310, a position of the determination area W4 is updated to a position which is moved by one pixel on the image represented by the image data in comparison with the position before the setting operation was executed (see FIG. 3A).

After setting the determination area W4, the processor 50 selects the P4 (−1, 2) as the color determination pixel (Q0), the pixel P4(−1, 1) as the first pixel (R1), the pixel P4(−1, −1) as the second pixel (R2) and the pixel P4(−1, −2) as the third pixel (R3) in S320.

Figures 11A, 11B, 11C, 11D:
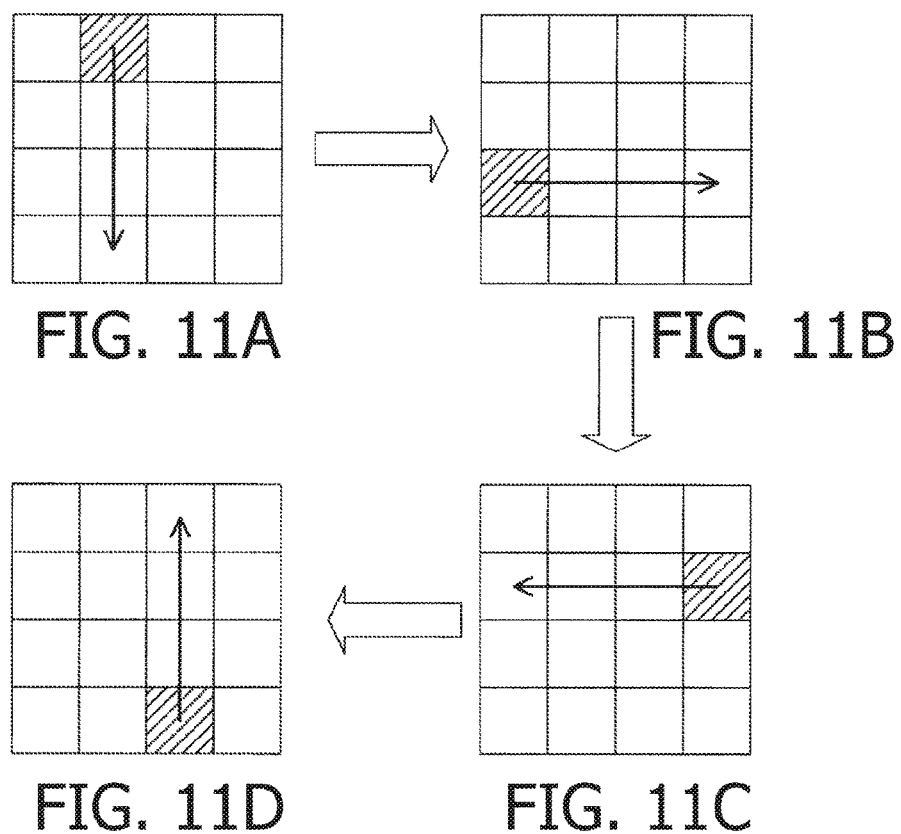
FIGS. 11A-11D illustrate a selection operation of a color determination pixels according to the second illustrative embodiment.

The color determination pixel (Q0) selected in S320 corresponds to a pixel hatched by oblique lines in FIG. 11A. The first pixel (R1), the second pixel (R2) and the third pixel (R3) correspond to three pixels arranged, below the hatched pixel, along an arrow, respectively.

Figure 12:
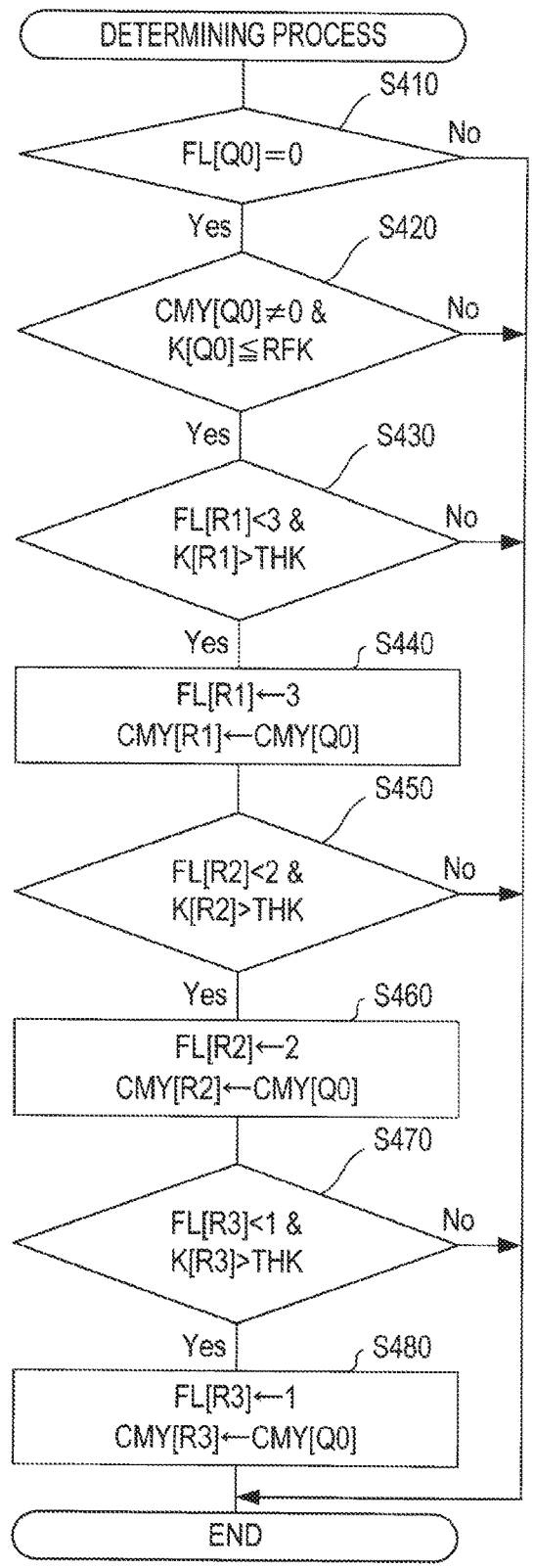
FIG. 12 is a flowchart illustrating the determining process according to the second illustrative embodiment.

After the selection operation in S320, the processor 50 executes the trapping process on each of the first pixel (R1), the second pixel (R2) and the third pixel (R3) as needed by executing a determining process shown in FIG. 12 in S330.

In the determining process (see FIG. 12), the processor 50 determines whether the FL-value of the color determination pixel (Q0) is zero (S410). It is noted that the initial value of the FL-value is zero. When the FL-value is zero, the trapping process has not been executed on the corresponding pixel. Expressions using parentheses "[xx]" in FIG. 12 (i.e., FL[xx], CMY[xx] and K[xx]) have the same meaning as described in the first embodiment.

When the processor 50 determines that the FL-value of the color determination pixel (Q0) is not zero (S410: NO), the processor 50 terminates the determining process. When the processor 50 determines that the FL-value of the color determination pixel (Q0) is zero (S410: YES), the processor 50 determines whether the CMY-value and the K-value of the color determination pixel (Q0) satisfy the same conditions as referred to in S220 of the first embodiment (see FIG. 6).

That is, when the CMY-value of the color determination pixel (Q0) is not zero and the K-value of the color determination pixel (Q0) is equal to or less than the reference value RFK (i.e., CMY[Q0]≠0, and K[Q0]≤RFK), the processor 50 makes an affirmative decision, or otherwise the processor 50 makes a negative decision in S420. It is note that the affirmative decision in S420 corresponds to the color determination pixel (Q0) being determined to have a chromatic color other than black.

When making the affirmative decision in S420, the processor 50 terminates the determination process. When making the negative decision in S420, the processor 50 determines whether the FL-value and the K-value of the first pixel (R1) satisfy the following conditions in S430. The conditions include (1) the FL-value of the first pixel (R1) is less than three, and (2) the K-value of the first pixel (R1) is larger than the threshold value THK.

Therefore, when the FL-value of the first pixel (R1) is less than three, and the K-value of the first pixel (R1) is larger than the threshold value THK (i.e., FL[R1]<3, and K[R1]>THK), the processor 50 makes the affirmative decision, or otherwise the processor 50 makes the negative decision.

According to the present embodiment, the FL-value is one of zero, one, two or three. As described above, when the trapping process has not been executed on a pixel, the FL-value of the pixel is zero. When the trapping process has been executed on a pixel, the FL-value of the pixel is one of one, two and three. Concretely, when the first trapping process has been executed on the corresponding pixel, the FL-value of the pixel is three, when the second trapping process has been executed on the corresponding pixel, the FL-value of the corresponding pixel is two, and when the third trapping process has been executed on the corresponding pixel, the FL-value of the corresponding pixel is one.

The first trapping process is, similar to that in the first embodiment, the trapping process for the first pixel (R1) which is adjacent to the color determination pixel (Q0), and the second trapping process is the trapping process for the second pixel (R2) apart from the color determination pixel (Q0) by one pixel. Further, the third trapping process is the trapping process for the third pixel (R3) which is space from the color determining pixel (Q0) by two pixels.

Accordingly, in S430, when the first pixel (R1) is the black pixel, and when the first trapping process has not been executed on the first pixel (R1), the processor 50 makes the affirmative decision.

When making the negative decision in S430, the processor 50 terminates the determining process. When making the affirmative decision in S430, the processor 50 executes the first trapping process on the first pixel (R1) in S440. That is, the processor 50 executes a process of adding the color components of the color determination pixel (Q0) on the first pixel (R1) (i.e., the first trapping process) by replacing the CMY-value of the first pixel (R1) with the CMY-value of the color determining pixel (Q0) as shown in FIG. 13A.

Figure 13A:
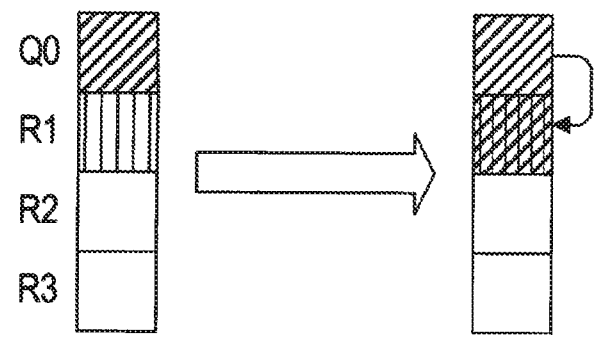
FIGS. 13A-13C illustrate the trapping process according to the second illustrative embodiment.

In FIG. 13A, a pixel hatched by oblique lines corresponds to the color determination pixel (Q0) having a chromatic color, a pixel hatched by straight lines extending in the up-down direction corresponds to the first pixel (R1) of which color is black, and a pixel hatched by a combination of the oblique lines and straight lines extending in the up-down direction corresponds to the first pixel (R1) on which the trapping process has been executed.

In S440, the processor 50 further updates the FL-value of the first pixel (R1) to three. After executing S440, the processor 50 determines whether the FL-value and K-value of the second pixel (R2) satisfy the following conditions (S450). The conditions include (1) the FL-value of the second pixel (R2) is less than two, and (2) the K-value of the second pixel (R2) is larger than the threshold value THK.

The processor 50 makes the affirmative decision when the FL-value of the second pixel (R2) is less than two, and the K-value thereof is larger than the threshold value THK (i.e., FL[R2]<2, and K[R2]>TRK) in S450, or otherwise makes the negative decision. That is, in S450, the processor 50 makes the affirmative decision when the second pixel (R2) and the first pixel (R1) are black pixels, and none of the first trapping process and the second trapping process has been executed on the second pixel (R2).

Figure 13B:
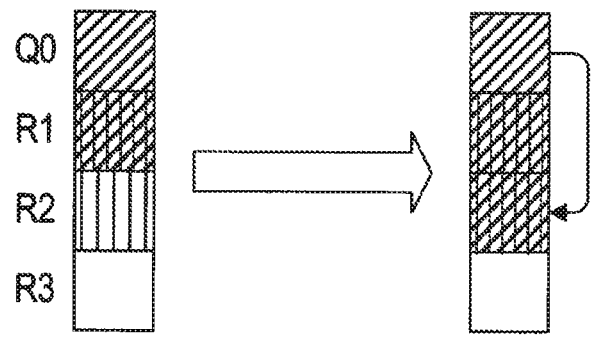

When making the negative decision in S450, the processor 50 terminates the determining process. When making the affirmative decision in S450, the processor 50 executes the trapping process on the second pixel (R2) in S460. That is, as shown in FIG. 13B, the processor 50 executes the process of adding the color components of the color determination pixel (Q0) on the second pixel (R2) (i.e., the second trapping process) by replacing the CMY-value of the second pixel (R2) with the CMY-value of the color determination pixel (Q0). In S460, the processor 50 further sets the FL-value of the second pixel (R2) to two.

In FIG. 13B, a pixel hatched by oblique lines corresponds to the color determination pixel (Q0) having a chromatic color, a pixel hatched by straight lines extending in the up-down direction corresponds to the second pixel (R2) of which color is black, and pixels hatched by a combination of the oblique lines and straight lines extending in the up-down direction correspond to the first pixel (R1) and the second pixel (R2) on which the trapping process has been executed.

After executing S460, the processor 50 determines whether the FL-value and K-value of the third pixel (R2) satisfy the following conditions (S470). The conditions include (1) the FL-value of the third pixel (R3) is less than one, and (2) the K-value of the third pixel (R3) is larger than the threshold value THK.

The processor 50 makes the affirmative decision when the FL-value of the third pixel (R3) is less than one, and the K-value thereof is larger than the threshold value THK (i.e., FL[R3]<1, and K[R3]>THK) in S470, or otherwise makes the negative decision. That is, in S470, the processor 50 makes the affirmative decision when the third pixel (R3), together with the first pixel (R1) and the second pixel (R2) which are located between the third pixel (R3) and the color determination pixel (Q0), is a black pixel, and none of the first trapping process, the second trapping process and the third trapping process has been executed on the third pixel (R3).

When making the negative decision in S470, the processor 50 terminates the determining process. When making the affirmative decision in S470, the processor 50 executes the trapping process on the third pixel (R3) in S480. That is, as shown in FIG. 13C, the processor 50 executes the process of adding the color components of the color determination pixel (Q0) on the third pixel (R3) (i.e., the third trapping process) by replacing the CMY-value of the third pixel (R3) with the CMY-value of the color determination pixel (Q0).

Figure 13C:
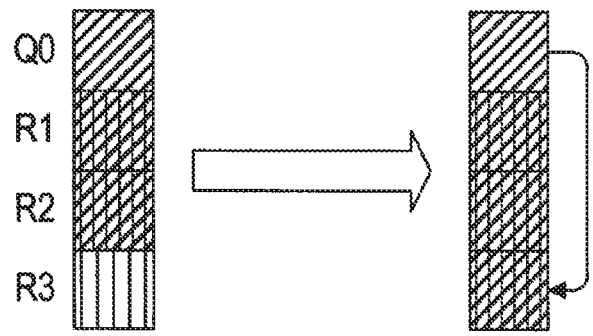

In FIG. 13C, a pixel hatched by oblique lines corresponds to the color determination pixel (Q0) having a chromatic color, a pixel hatched by straight lines extending in the up-down direction corresponds to the third pixel (R3) of which color is black, and pixels hatched by a combination of the oblique lines and straight lines extending in the up-down direction correspond to the first pixel (R1), the second pixel (R2) and the third pixel (R3) on which the trapping process has been executed.

In S480, the processor 50 updates the FL-value of the third pixel (R3) to one. Thereafter, the processor 50 terminates the determining process.

As above, the processor 50 determines necessity of the trapping processes, in the determining process shown in FIG. 12, based on one color determination pixel (Q0) within the determination area W4, for the first pixel (R1) adjacent to the color determination pixel (Q0), for the second pixel (R2) which, in association with the color determination pixel (Q0), sandwiches the first pixel (R1), and for the third pixel (R3) which, in association with the color determination pixel (Q0), sandwiches the first pixel (R1) and the second pixel (R2), and executes the trapping processes as needed.

After terminating, the determining process in S330 (see FIG. 10), the processor 50 newly selects the pixel P4(-2, -1) as the color determining pixel (Q0), the pixel P4(-1, -1) as the first pixel (R1), the pixel P4(1, -1) as the second pixel (R2), and the pixel P4(2, -1) as the third pixel (R3) in S340.

The color determining pixel (Q0) selected in S340 corresponds to the pixel hatched by oblique lines in FIG. 11B. The first pixel (R1), the second pixel (R2) and the third pixel (R3) correspond to three pixels arranged, on a right-hand side of the hatched pixel, along an arrow, respectively, in FIG. 11B.

After selecting the pixels in S340, the processor 50 executes the determining process shown in FIG. 12 (S350). In S350, the process similar to the process executed in S330 is executed on the color determining pixel (Q0), the first pixel (R1), the second pixel (R2) and the third pixel (R3) selected in S340.

After terminating the determining process in S350, the processor 50 selects the pixel P4(2, 1) as the color determining pixel (Q0), the pixel P4(1, 1) as the first pixel (R1), the pixel P4(-1, 1) as the second pixel (R2) and the pixel P4(-2, 1) as the third pixel (R3) in S360.

The color determining pixel (Q0) selected in S360 corresponds to the pixel hatched by oblique lines in FIG. 11C. The first pixel (R1), the second pixel (R2) and the third pixel (R3) correspond to three pixels arranged, on a left-hand side of the hatched pixel, along an arrow, respectively, in FIG. 11C.

After selecting the pixels in S360, the processor 50 executes the determining process shown in FIG. 12 (S370). In S370, the process similar to the process executed in S330 is executed on the color determining pixel (Q0), the first pixel (R1), the second pixel (R2) and the third pixel (R3) selected in S360.

After terminating the determining process in S370, the processor 50 selects the pixel P4(1, −2) as the color determining pixel (Q0), the pixel P4(1, 1) as the first pixel (R1), the pixel P4(1, 1) as the second pixel (R2) and the pixel P4(1, 2) as the third pixel (R3) in S380.

The color determining pixel (Q0) selected in S380 corresponds to the pixel hatched by oblique lines in FIG. 11D. The first pixel (R1), the second pixel (R2) and the third pixel (R3) correspond to three pixels arranged, on an upper side of the hatched pixel, along an arrow, respectively, in FIG. 11D.

After selecting the pixels in S380, the processor 50 executes the determining process shown in FIG. 12 (S390). In S390, the process similar to the process executed in S330 is executed on the color determining pixel (Q0), the first pixel (R1), the second pixel (R2) and the third pixel (R3) selected in S380.

When the processor 50 terminates a process in S390, the processor 50 terminates the trapping control process for the determination area W4 which is set in S310. Thereafter, the processor 50 newly starts the trapping control process and executes the trapping process in S320 or later as needed regarding the determination area W4 updated in S310.

According to the image formation system 1 described above, although the trapping process searches for the pixel on which the trapping process is to be executed, and the trapping process is executed on the pixel as searched within the 4×4 pixel area, the trapping process can be executed on the third pixel (R3) apart from the color determination pixel (Q0) by two pixels, as in a conventional method in which the trapping process is executed using a 7×7 pixel window.

It is because the image formation system 1 according to the present embodiment configured to sequentially select a plurality of surrounding pixels located at sides of the determination area W4 (i.e., the tour surrounding pixels P4(−1, −2), P4(−2, −1), P4(2, 1) and P4(1, −2)) as the color determination pixel (Q0), and apply the trapping process to the first pixel (R1) adjacent to the color determination pixel (Q0), the second pixel (R2) apart from the color determination pixel (Q0) by one pixel, and the third pixel (R3) apart from the color determination pixel (Q0) by two pixels.

If the processes regarding the trapping are executed using the 7×7 pixel window as in a conventional method, it would be necessary to provide an area buffer for 7×7 pixel and line buffers for six lines of pixels in the buffer 60. Therefore, according to the present embodiment, with suppressing the buffer size, the trapping process can be executed efficiently.

Further, according to the present embodiment, by employing the FL-value which is flag information, execution of the second trapping process for the pixel on which the first trapping process has been execute is restricted, and execution of the third trapping process on the pixel on which one of the first trapping process and the second trapping process has been executed is restricted.

That is, according to the present embodiment, the processor 50 updates the FL-value of the pixel on which the first trapping process is executed to three (S440), the FL-value of the pixel on which the second trapping process is executed to two (S460), and the FL-value of the pixel on which the third trapping process is executed to one (S480). Further, regarding the pixels of which FL-value is three, the processor 50 does not proceed to S460 (S450: NO)), thereby execution of the second trapping process being restricted. Further, regarding the pixels of which FL-values are three or two, the processor 50 does not proceed to S480 (S470: NO), thereby execution of the third trapping process being restricted.

Therefore, according to the present embodiment, even if the size of the determination area is suppressed to 4×4 pixel area, appropriate tapping process can be executed as in the first embodiment.

It is noted that, as is understood from the processing content of FIG. 12, the FL-value represents priority of the first trapping process, the second trapping process and the third trapping process, and the higher the priority is, the larger the FL-number is. The FL-number functions conveniently to control the trapping process.

Further, according to the present embodiment, in the determination area W4, by selecting a plurality of surrounding pixels adjacent to the central part of the determination area W4 according to a particular order as the color determination pixels (Q0) and then executing the trapping process, the order of priority of the trapping processes is managed. Therefore, even though a relatively small-sized determination area is used, a highly uniform trapping process can be executed at a boundary between the chromatic color pixels and the black pixels.

[Third Embodiment]

An image formation system 1 according to a third embodiment is different from the image formation system 1 according to the second embodiment only in the trapping control process and the determining process executed by the processor 50. Accordingly, in the following description, referring to FIGS. 14-17C, different parts of the trapping control process and the determining process executed by the processor 50 will be described.

In the second embodiment, necessity of the trapping process for a plurality of objective pixels (i.e., the first, second and third pixels) are determined based on the color determination pixel. According to the third embodiment, necessity of the trapping process will be determined in a different way. That is, according to the third embodiment, based on a single objective pixel, a plurality of color determination pixels (e.g., first, second and third determination pixels) are set. Then, for each of the plurality of color determination pixels, whether the trapping process to add the color components of the color determination pixels to the objective pixel should be executed.

Figure 14:
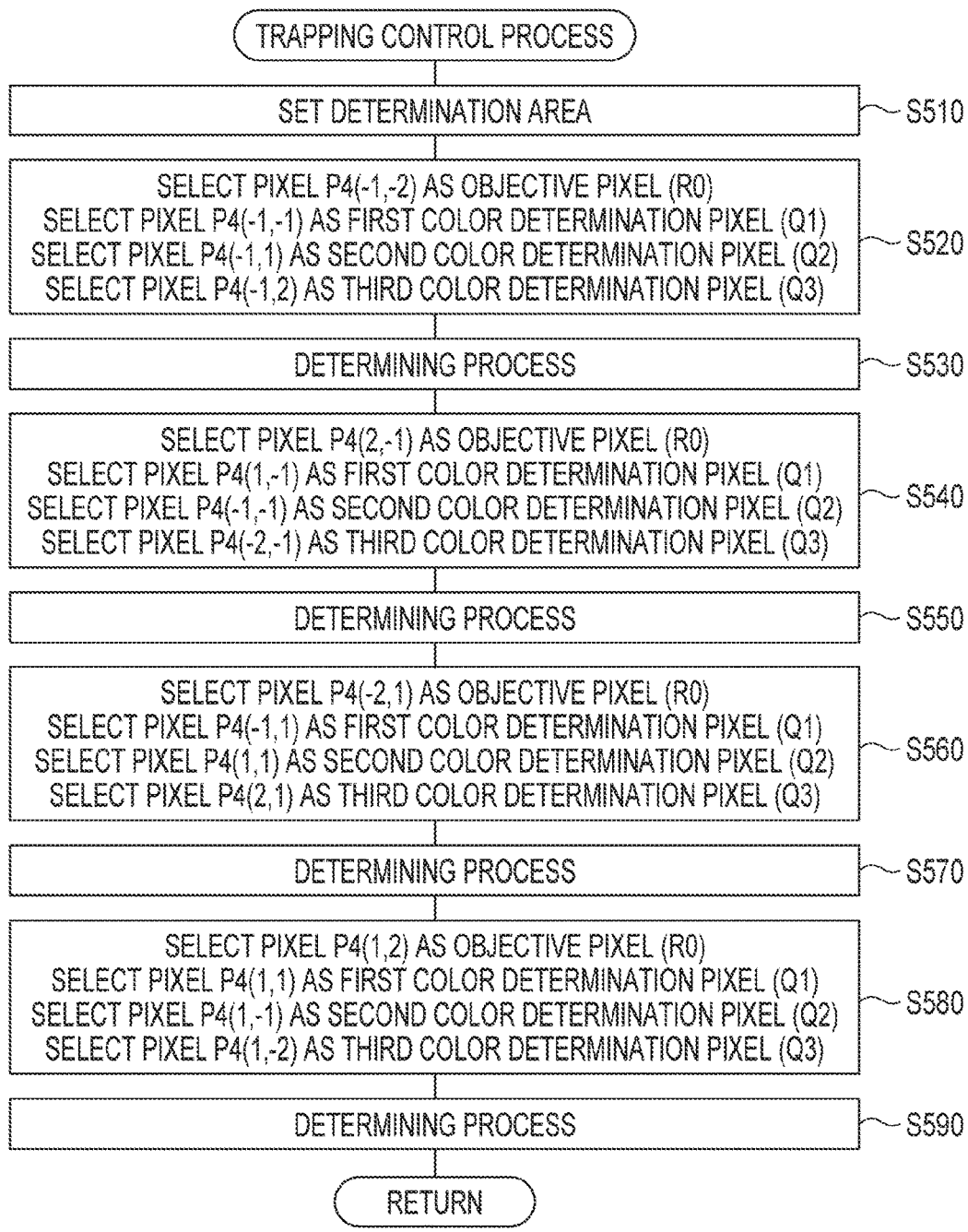
FIG. 14 is a flowchart illustrating the trapping control process according to a third illustrative embodiment.

In the present embodiment, as the processor 50 repeatedly executes the trapping control process shown in FIG. 14, the determination areas W4 is set to a 4×4 pixel area and the trapping process is executed on each of the determination areas W4.

When the trapping control process is started, the processor 50 sets, in S510, the determination area W4 as in S310.

After setting the determination area W4, the processor 50 selects a pixel P4(−1, −2) which is one of surrounding pixels adjacent to a central part of the determination area W4 as the objective pixel (R0), a pixel P4(−1, −1) as a first color determination pixel (Q1), a pixel P4(−1, 1) as a second color determination pixel (Q2) and a pixel P4(−1, 2) as a third color determination pixel (Q3) in S520.

The objective pixel (R0) selected in S520 corresponds to a pixel hatched by straight lines extending in the up-down direction in FIG. 15A. The first color determination pixel (Q1), the second color determination pixel (Q2) and the third color determination pixel (Q3) correspond to three pixels above the hatched pixel in FIG. 15A arranged along an arrow, respectively.

Figure 16:
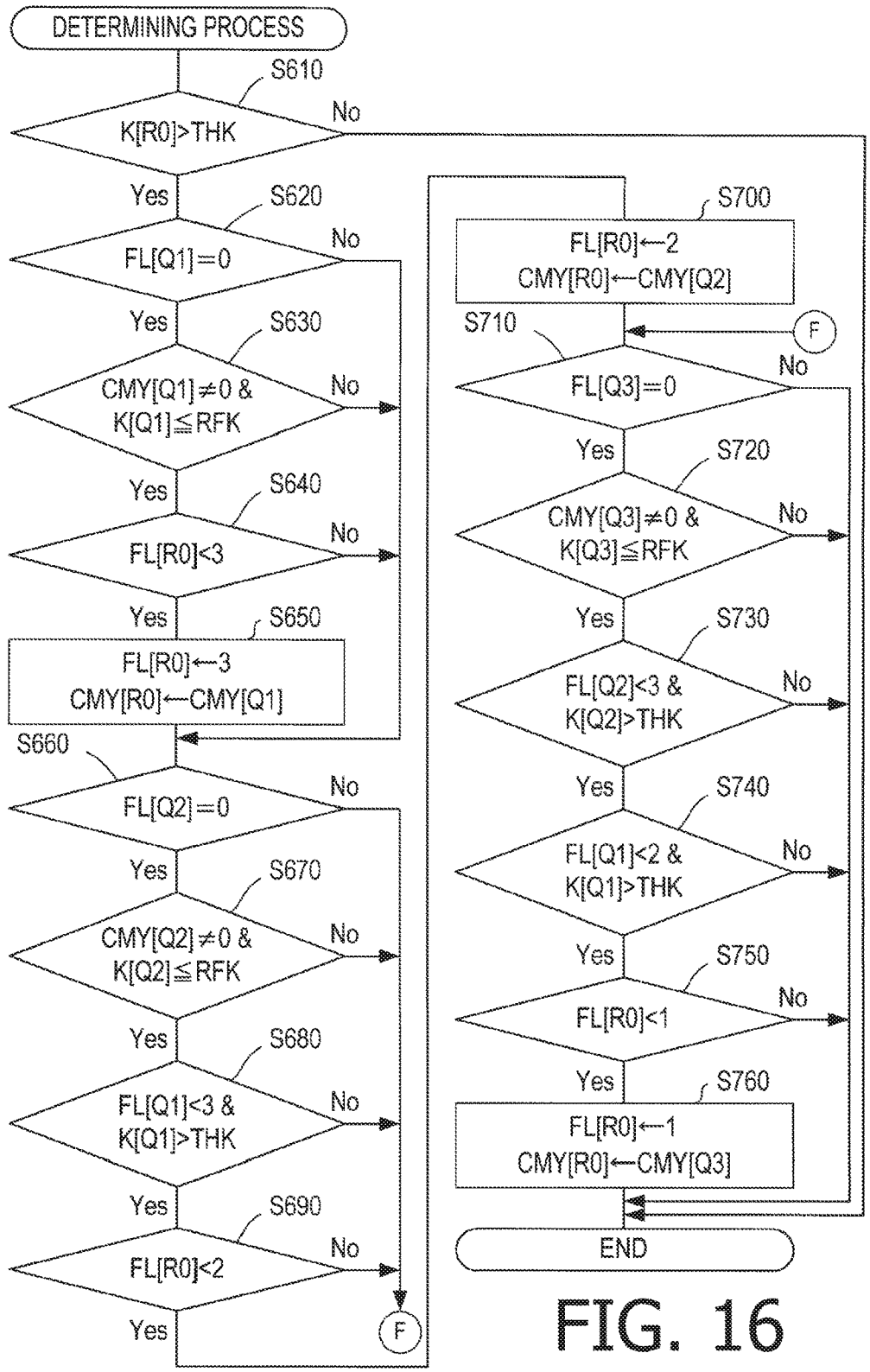
FIG. 16 is a flowchart illustrating an object determining process according to the third illustrative embodiment.

After the selection in S520, the processor 50 executes the determining process shown in FIG. 16 to execute the trapping process, as needed, on the objective pixel based on one of the first color determination pixel (Q1), the second color determination pixel (Q2) and the third color determination pixel (Q3). It is noted that the symbols F[xx], CMY[xx], and K[xx] used in FIG. 16 have the same meaning in the first and second embodiments.

In the determining process in FIG. 16, the processor 50 determines whether the K-value of the objective pixel is larger than the threshold value THK (S610). It is noted that the decision in S610 corresponds to determination whether the objective pixel (R0) is the black pixel or not.

When making a negative decision in S610, the processor 50 terminates the determining process. When making an affirmative decision in S610, the processor 50 determines whether the FL-value of the first color determination pixel (Q1) is zero (S620). It is noted that, when the FL-value of the first color determination pixel (Q1) is zero, the trapping process has not be executed on the first color determination pixel (Q1).

When the processor 50 determines that the FL-value of the first color determination pixel (Q1) is not zero (S620: NO), the processor 50 proceeds to S660. When the processor 50 determines that the FL-value of the first color determination pixel (Q1) is zero (S620: YES), the processor 50 proceeds to S630.

In S630, the processor 50 determines whether the CMY-value and the K-value of the first color determination pixel (Q1) satisfy the following conditions. The conditions include (1) the CMY-value of the first color determination pixel (Q1) is not zero, and (2) the K-value of the first color determination pixel (Q1) is equal to or less than the reference value RFK.

The processor 50 makes an affirmative decision when the CMY-value of the first color determining pixel (Q1) is not zero and the K-value of the first color determining pixel (Q1) is equal to or less than the reference value RFX (i.e., CMY[Q1]≠0, and K[Q1]≤RFK), or otherwise the processor 50 makes the negative decision. To make the affirmative decision in S630 corresponds to determine that the color of the first, color determination pixel (Q1) is the chromatic color other than black.

When making the negative decision in S630, the processor 50 proceeds to S660. When making the affirmative decision in S630, the processor 50 proceeds to S640. In S640, the processor 50 determines whether the FL-value of the objective pixel (R0) is less than three.

When the processor 50 determines that the FL-value of the objective pixel (R1)) is less than three (S640: YES), the processor 50 proceeds to S650, or otherwise (S640: NO) proceeds to S660.

In the present embodiment, the FL-value is one of zero, one, two and three. As described above, the FL-value of the pixel on which the trapping process has not been executed is zero. On the other hand, the FL-value of the pixel on which the trapping process has executed is one of one, two and three. Concretely, when the first trapping process has been executed on the corresponding pixel, the FL-value of the pixel is three. When the second trapping process has been executed on the corresponding pixel, the FL-value of the pixel is two. When the third trapping process has been executed on the corresponding pixel, the FL-value of the pixel is one.

The first trapping process according to the present embodiment corresponds to the trapping process for the objective pixel (R0) based on the first color determination pixel (R1) adjacent to the objective pixel (R0). The second trapping process according to the present embodiment corresponds to trapping process for the objective pixel (R0) based on the second color determination pixel (Q2) which is apart from the objective pixel (R0) by one pixel. The third trapping process corresponds to the trapping process for the objective pixel based on the third color determination pixel apart from the objective pixel (R0) by two pixels.

Therefore, the processor 50 proceeds to S650 only when the first color determination pixel (Q1) is a chromatic color pixel on which the trapping process has not been executed, and the objective pixel (R0) is the black pixel on which the first trapping process has not been executed, otherwise to S660.

In S650, the processor 50 executes the first topping process for the objective pixel (R0). That is, the processor 50 executes a process of adding the color components of the first color determination pixel (Q1) to the objective pixel (R0) (i.e., the first trapping process) by replacing the CMY-value of the objective pixel (R0) with the CMY-value of the first color determination pixel (Q1) as shown in FIG. 17A.

Figure 17A:
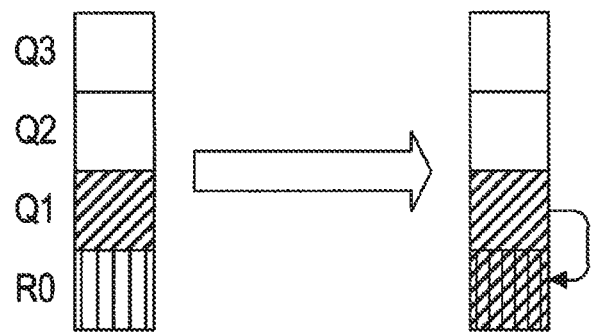
FIGS. 17A-17C illustrate the trapping process according to the third illustrative embodiment.

In FIG. 17A, a pixel hatched by oblique liens corresponds to the first color determination pixel (Q1) having a chromatic color, and a pixel hatched by straight lines extending in the up-down direction corresponds to the black objective pixel (R0). A pixel hatched by both the oblique lines and the straight line extending in the up-down direction is the objective pixel (R0) on which the first trapping process has been executed.

In S650, the processor 50 updates the FL-value of the objective pixel (R0) to three, and proceeds to S660. In S660, the processor 50 determines whether the FL-value of the second color determination pixel (Q2) is zero. When determining that the FL-value, of the second color determination pixel (Q2) is not zero (S660: NO), the processor 50 proceeds to S710. When the processor 50 determines, in S660, that the FL-value of the second color determination pixel (Q2) is zero (S660: YES), the processor 50 proceeds to S670.

In S670, the processor 50 determines whether the CMY-value and the K-value of the second color determination pixel (Q2) satisfy the following conditions. The conditions include (1) the CMY-value of the second color determination pixel (Q2) is not zero, and (2) the K-value of the second color determination pixel (Q2) is equal to or less than the reference value RFK.

When the CMY-value of the second color determination pixel (Q2) is not zero, and the K-value of the second color determination pixel (Q2) is equal to or less than the reference value RFK (i.e., CMY[Q2]≠0, and K[Q2]≤0), the processor 50 makes the affirmative decision in S670, otherwise the negative decision. To make the affirmative decision in S670 corresponds to determine that the color of the second color determination pixel (Q2) is the chromatic color other than black.

When the processor 50 makes the negative decision in S670, the processor 50 proceeds to S710. When the process 50 makes the affirmative decision in S670, the processor 50 determines, in S680, whether the FL-value of the first color determination pixel (Q1) is less than three and the K-value of the first color determination pixel (Q1) is larger than the threshold value THK.

When the FL-value of the first color determination pixel (Q1) is less than three and the K-value of the first color determination pixel (Q1) is larger than the threshold value THK, the processor 50 makes the affirmative decision in S680, otherwise the negative decision in S680. When the processor 50 makes the affirmative decision in S680, the first color determination pixel (Q1) corresponds to a black pixel on which the first trapping process has not been executed.

When the processor 50 makes the negative decision in S680, the processor 50 proceeds to S710. When making the affirmative decision in S680, the processor 50 determines whether the FL-value of the objective pixel (R0) is less than two (S690).

When the FL-value of the objective pixel (R0) is less than two, the processor 50 makes an affirmative decision and proceeds to S700, or otherwise makes a negative decision and proceeds to S710. That is, when the second color determination pixel (Q2) is the chromatic color pixel on which the trapping process has not been executed, the first color determination pixel (Q1) is a black pixel on which the first trapping process has not been executed, and the objective pixel (R0) is a black pixel on which none of the first and second trapping processes has been executed, the processor 50 proceeds to S700, otherwise the processor 50 proceeds to S710.

In S700, the processor 50 executes the second trapping process on the objective pixel (R0). That is, the processor 50 execute a process of adding the color component of the second color determination pixel (Q2) to the objective pixel (R0) (i.e., the second trapping process) by replacing the CMY-value of the objective pixel (RU) with the CMY-value of the second color determination pixel (Q2) as shown in FIG. 17B.

Figure 17B:
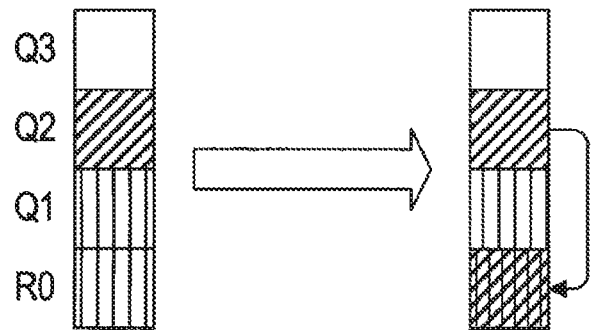

In FIG. 17B, a pixel hatched by oblique lines correspond to the second color determination pixel (Q2) having a chromatic color, and pixels hatched by straight lines extend in the up-down directions correspond to the black first color determination pixel (Q1) and the black objective pixel (R0), and a pixel hatched by a combination of the oblique lines and the straight lines extending in the up-down direction corresponds to the objective pixel (R0) on which the second trapping process has been executed.

In S700, the processor 50 updates the FL-value of the objective pixel (R0) to two, and then proceeds to S710. In S710, the processor 50 determines whether the FL-value of the third color determination pixel (Q3) is zero. When determining that the FL-value of the third color determination pixel (Q3) is not zero (S710: NO), the process 50 terminates the determining process. When determining that the FL-value of the third color determination pixel (Q3) is zero (S710: YES), the process 50 proceeds to S720.

In S720, the processor 50 determines whether the CMY-value and K-value of the third color determination pixel (Q3) satisfy the following conditions. The conditions include (1) the CMY-value of the third color determination pixel (Q3) is not zero, and (2) the K-value of the third color determination pixel (Q3) is equal to or less than the reference value RFK.

When the CMY-value is not zero and the K-value is equal to or less than the reference value RFK (i.e., CMY[Q3]≠0, and K[Q3]≤RFK), the processor 50 makes the affirmative decision in S720, or otherwise the negative decision. To make an affirmative decision in S720 corresponds to determine that the color of the third color determination pixel. (Q3) is a chromatic color other than black.

When the processor 50 makes the negative decision in S720, the processor 50 terminates the determining process. When the processor 50 makes the affirmative decision in S720, the processor 50 determines, in S730, whether the FL-value of the second color determination pixel (Q2) is less than three, and the K-value of the second color determination pixel (Q2) is larger than the threshold value THK.

When the FL-value of the second color determination pixel (Q2) is less than three, and the K-value of the second color determination pixel (Q2) is larger than the threshold value THK, the processor 50 makes an affirmative decision in S730, or otherwise the negative decision in S730. When the processor 50 makes the affirmative decision in S730, the second color determination pixel (Q2) corresponds to the black pixel on which the first trapping process has not been executed.

When making the negative decision in S730, the processor 50 terminates the determining process. When making the affirmative decision in S730, the processor 50 determines, in S740, whether the FL-value of the first color determination pixel (Q1) is less than two, and the K-value of the first color determination pixel (Q1) is larger than the threshold value THK.

When the FL-value of the first color determination pixel (Q1) is less than two, and the K-value of the first color determination pixel (Q1) is larger than the threshold value THK, the processor 50 makes the affirmative decision in S740, or otherwise makes the negative decision in S740. When the processor 50 makes the affirmative decision in S740, the first color determination pixel (Q1) corresponds to the black pixel on which none of the first and second trapping processes has been executed.

When making the negative decision in S740, the processor 50 terminates the determining process. When making the affirmative decision in S740, the processor 50 determines whether the FL-value of the objective pixel (R0) is less than one in S750.

When the FL-value of the objective pixel (R0) is less than one, the processor 50 proceeds to S760, or otherwise terminates the determining process. That is, when the third color determination pixel (Q3) is a chromatic color pixel on which the trapping process has not been executed, the second color determining pixel (Q2) is a black pixel on which the first trapping process has not been executed, the first color determination pixel (Q1) is a black pixel on which none of the first and second trapping processes has been executed, and the objective pixel (R0) is a black pixel on which none of the first, second and third trapping processes have been executed, the processor 50 proceeds to S760, or otherwise terminates the determining process.

The processor 50 executes the third trapping process on the objective pixel (R0) in S760. That is, the processor 50 executes a process of adding the color components of the third color determination pixel (Q3) to the objective pixel (R0) (i.e., the third trapping process) by replacing the CMY-value of the objective pixel (R0) with the CMY-value of the third color determination pixel (Q3) as shown in FIG. 17C.

Figure 17C:
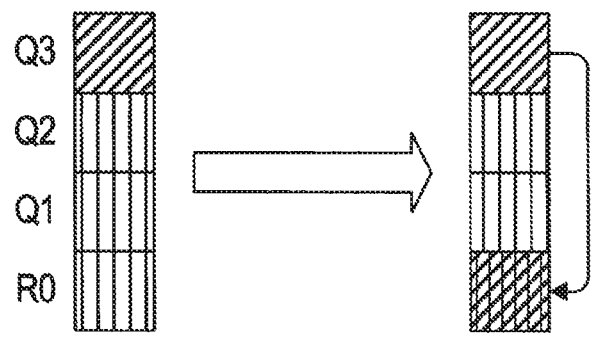

In FIG. 17C, a pixel hatched by oblique liens corresponds to the chromatic color third color determination pixel (Q3), and pixels hatched by straight lines extending in the up-down direction correspond to black second color determination pixel (Q2), first color determination pixel (Q1) and objective pixel (R0). Further, a pixel hatched by a combination of the oblique lines and the straight lines extending in the up-down direction corresponds to the objective pixel (R0) to which the third trapping process has been executed.

In S760, the processor 50 further updates the FL-value of the objective pixel (R0) to one, and thereafter, terminates the determining process. After terminating the determining process, as shown in FIG. 14, the processor 50 newly selects a pixel P4(2, −1) as the objective pixel (R0), a pixel P4(1, −1) as the first color determination pixel (Q1), a pixel P4(−1, −1) as the second color determination pixel (Q2), and a pixel P4(−2, −1) as the third color determining pixel (Q3) in S540.

The objective pixel (R0) selected in S540 corresponds to a pixel hatched by straight lines extending in the up-down direction in FIG. 15B. The first color determination pixel (Q1), the second color determination pixel (Q2) and the third color determination pixel (Q3) correspond to three pixels, in FIG. 15B, on the left-hand side of the objective pixel (R0) aligned along the arrow, respectively.

After the selection in S540, the processor 50 determines, in S550, a determining process, which is the same as the determining process executed in S530, for the objective pixel (R0), the first color determination pixel (Q1), the second color determination pixel (Q2) and the third color determination pixel (Q3) which are selected in S540.

After terminating the determining process in S550, the processor 50 selects the pixel P4(−2, 1) as the objective pixel (R0), the pixel P4(−1, 1) as the first color determination pixel (Q1), the pixel (1, 1) as the second color determination pixel (Q2) and the pixel P4(2, 1) as the third color determination pixel (Q3) in S560.

The objective pixel (R0) selected in S560 corresponds to a pixel hatched by straight lines extending in the up-down direction in FIG. 15D, further, the first color determination pixel (Q1), the second color determination pixel (Q2) and the third color determination pixel (Q3) correspond to three pixels, in FIG. 15C, on the left-hand side of the objective pixel (R0) aligned along an arrow, respectively.

After the selection in S560, the processor 50 determines, in S570, a determining process (see FIG. 16), which is the same as the determining process executed in S560, for the objective pixel (R0), the first color determination pixel (Q1), the second color determination pixel (Q2) and the third color determination pixel (Q3) which are selected in S530.

After terminating the determining process in S570, the processor 50 selects the pixel P4(1, 2) as the objective pixel (R0), the pixel P4(1, 1) as the first color determination pixel (Q1), the pixel (1, −1) as the second color determination pixel (Q2) and the pixel P4(1, −2) as the third color determination pixel (Q3) in S580.

The objective pixel (R0) selected in S580 corresponds to a pixel hatched by straight lines extending in the up-down direction in FIG. 15D, further, the first color determination pixel (Q1), the second color determination pixel (Q2) and the third color determination pixel (Q3) correspond to three pixels, in FIG. 15D, below the objective pixel (R0) aligned along an arrow, respectively.

After the selection in S580, the processor 50 determines, in S590, a determining process (see FIG. 16), which is the same as the determining process executed in S530, for the objective pixel (R0), the first color determination pixel (Q1), the second color determination pixel (Q2) and the third color determination pixel (Q3) which are selected in S580.

When the processor 50 terminates a process in S590 the processor 50 terminates the trapping control process for the determination area W4 which is set in S510. Thereafter, the processor 50 newly starts the trapping control process and executes the trapping process in S520 or later as needed, regarding the determination area W4 updated in S510.

With the image formation system 1 according to the third embodiment, the same effects obtained in the second embodiment can be obtained.

[Other Embodiments]

It is noted that the aspects of the present disclosures need not be limited to the configurations of the first, second and third embodiments are described above, but various modifications can be made without departing from the aspects of the present disclosures.

For example, the size of the determination area need not be limited to the 3×3 pixel size or 4×4 pixel size. That is, the aspects of the present disclosures can apply to the determination area of which size is 5×5 pixel size or larger. The effects of the present disclosures to reduce the buffer size is more significant for the determination area having a larger size. It is also noted that the determination area need not be limited to a square area but a rectangular area having different side lengths.

It is noted that the aspects of the present disclosers is applicable to various image formation systems as well as the laser printer in which the void could occur due to positional errors in overlaying color component images.

It is noted that a function, which is realized by one component of the above-described embodiments, may be distributed to a plurality of components and realized thereby. On the other hand, a plurality of components, which are configured to realize a single function in the above-described embodiment, may be integrated to less number of or a single component. Part of the above-described configurations of the embodiments may be omitted. At least a part of one of the configuration of the above-describe embodiments may be added to or replaced with the configuration of another embodiment.

What is claimed is:

1. An image processing apparatus, comprising:
a storage configured to store image data; and
a controller,
wherein the controller is configured to execute:
receiving image data configured such that a plurality of pixel arrays each including a plurality of pixels are arranged in a main scanning direction, the plurality of pixel arrays being aligned in a sub scanning direction which is perpendicular to the main scanning direction;
setting a determination area having a particular number of pixels within a particular area of three lines or more in the sub scanning direction and three pixels or more in the main scanning direction;
sequentially selecting a plurality of pixels within the determination area as color determination pixels;
determining whether a color determination pixel of the selected color determination pixels has a chromatic color;
determining black pixels including:
determining whether a first pixel adjacent to the color determination pixel is black; and
determining whether a second pixel apart from the color determination pixel with one or more intermediate pixels therebetween is black;
determining execution of trapping processes including:
determining that a first trapping process to add a color component of the color determination pixel to the first pixel is to be executed when the controller determines that the color determination pixel has a chromatic color and the first pixel is black; and
determining that a second trapping process to add the color component of the color determination pixel to the second pixel is to be executed when it is determined that the color determination pixel has a chromatic color, the second pixel is black, and the intermediate pixels located between the color determination pixel and the second pixel are black;
executing trapping processes including:
executing the first trapping process on a pixel on which the first trapping process is determined to be executed; and
executing the second trapping process on a pixel on which the second trapping process is determined to be executed;
restricting execution of trapping processes including:

restricting execution of the second trapping process on the pixel on which the first trapping process is determined to be executed,
wherein a position of the second pixel within the determination area varies depending on the color determination pixel.

2. The image processing apparatus according to claim 1, the controller is further configured to execute:
adding flag information representing a result of a determination of the pixel on which the first trapping process is determined to be executed and the pixel on which the second trapping process is determined to be executed; and
restricting, by referring to the flag information, execution of the second trapping process on the pixel on which the first trapping process is determined to be executed.

3. The image processing apparatus according to claim 1, wherein the determination area is an area including four or more lines in the sub scanning direction and four or more pixels in the main scanning direction,
wherein the determining black pixels further includes:
determining whether a third pixel apart from the color determination pixel with two intermediate pixels therebetween is a black pixel;
wherein the determining execution of trapping processes further includes:
determining that a third trapping process to add the color component of the color determination pixel is to be executed on the third pixel when the color determination pixel is determined to have the chromatic color, the third pixel is determined to be a black pixel and the two intermediate pixels located between the color determination pixel and the third pixel are black pixels;
wherein the execution of trapping processes further includes:
executing the third trapping process with respect on the pixel on which the third trapping process is determined to be executed; and
wherein the restricting execution of the trapping processes further restricts execution of the third trapping process on the pixel on which the first trapping process is determined to be executed and the pixel on which the second trapping process is to be executed.

4. The image processing apparatus according to claim 3, wherein the determining execution of trapping processes adds flag information representing the determination result to the pixel on which the first trapping process is determined to be executed, on the pixel on which the second trapping process is determined to be executed, and the pixel on which the third trapping process is determined to be executed, and
wherein the restricting execution of the trapping processes further restricts execution of the second trapping process on the pixel on which the first trapping process is determined to be executed, and execution of the third trapping process on the pixel to which the first trapping process is determined to be executed and the pixel on which the second trapping process is determined to be executed.

5. The image processing apparatus according to claim 3, wherein the determination area includes four central pixels located at a central part of the determination area and a plurality of surrounding pixels arranged around and adjacent to the four central pixels,
wherein the color determination pixel is selected from the plurality of surrounding pixels, and wherein the determining black pixels includes, at every selection of the color determination pixel:
determining whether a first pixel which is adjacent to the color determination pixel in a direction from a position of the color determination pixel to a position of the central part is the black pixel;
determining whether a second pixel sandwiching, in association with the color determination pixel, the first pixel is the black pixel.

6. The image processing apparatus according to claim 5, wherein the determination area is a 4×4 pixel area including four lines of pixels in the sub scanning direction and four pixels in each line extending in the main scanning direction, and
wherein the plurality of surrounding pixels are pixels adjacent to four central pixels located at the center of the central part of the 4×4 pixel area in the main scanning direction and in the sub scanning direction.

7. The image processing apparatus according to claim 3, wherein the determination area includes four central pixels located at the central part of the determination area and a plurality of surrounding pixels arranged around and adjacent to the four central pixels,
wherein the color determination pixel includes a first color determination pixel, a second color determination pixel and a third color determination pixel,
wherein the sequentially selecting a plurality of pixels includes:
sequentially selecting the plurality of surrounding pixels in order as an objective pixel; and
selecting, at every selection of the objective pixel, a pixel which is adjacent to the objective pixel in a direction from a position of the objective pixel to a position of the central part as the first color determination pixel, a pixel sandwiching, in association with the objective pixel, the first color determination pixel as the second color determination pixel, and a pixel sandwiching, in association with the objective pixel, the first color determination pixel and the second color determination pixel as the third color determination pixel,
wherein the determining black pixels determine, at every selection of the objective pixel, whether the objective pixel serving as the first pixel corresponding to the first color determination pixel, the second pixel corresponding to the second color determination pixel and the third pixel corresponding to the third color determination pixel is the black pixel,
wherein the determining execution of trapping processes includes:
determining to execute a first trapping process to add a color component of the first color determination pixel to the objective pixel when the first color determination pixel is determined to have the chromatic color and the objective pixel is determined to be a black pixel; and
determining to execute a second trapping process to add a color component of the second color determination pixel to the objective pixel when the second color determination pixel is determined to have the chromatic color, the objective pixel is determined to be the black pixel and the first color determination pixel located between the second color determination pixel and the objective pixel is determined to be the black pixel
determining to execute a third trapping process to add a color component of the third color determination pixel to the objective pixel when the third color determination pixel is determined to have the chromatic color, the objective pixel is determined to be the black pixel and the first color determination pixel and the second color determination pixel located between the third color determination pixel and the objective pixel is determined to be the black pixel.

8. The image processing apparatus according to claim 7, wherein the determination area is a 4×4 pixel area including four lines of pixels in the sub scanning direction and four pixels in each line extending in the main scanning direction, and
wherein the plurality of surrounding pixels are pixels adjacent to four central pixels located at the center of the central part of the 4×4 pixel area in the main scanning direction and in the sub scanning direction.

9. The image processing apparatus according to claim 1, wherein the determination area includes one or more central pixels located at a central part of the determination area and a plurality of surrounding pixels arranged around and adjacent to the one or more central pixels,
wherein the color determination pixel is selected from the plurality of surrounding pixels, and
wherein the determining black pixels includes, at every selection of the color determination pixel:
  determining whether a first pixel which is adjacent to the color determination pixel in a direction from a position of the color determination pixel to a position of the central part is the black pixel; and
  determining whether a second pixel sandwiching, in association with the color determination pixel, the first pixel is the black pixel.

10. The image processing apparatus according to claim 9, wherein the determination area is a 3×3 pixel area including three lines of pixels in the sub scanning direction and three pixels in each line extending in the main scanning direction, and
wherein the plurality of surrounding pixels are pixels adjacent to one central pixel located at the center of the central part of the 3×3 pixel area in the main scanning direction and in the sub scanning direction.

11. The image processing apparatus according to claim 9, wherein the sequentially selecting a plurality of pixels sequentially selects the plurality of surrounding pixels within the determination area in accordance with a particular order.

12. The image processing apparatus according to claim 1, wherein the determination area includes one or more central pixels located at a central part of the determination area and a plurality of surrounding pixels arranged around and adjacent to the one or more central pixels,
wherein the color determination pixel includes a first color determination pixel and a second color determination pixel,
wherein the sequentially selecting a plurality of pixels includes:
  sequentially selecting the plurality of surrounding pixels in order as an objective pixel; and
  selecting, at every selection of the objective pixel, a pixel which is adjacent to the objective pixel in a direction from a position of the objective pixel to a position of the central part as the first color determination pixel and a pixel sandwiching, in association with the objective pixel, the first color determination pixel as the second color determination pixel,
wherein the determining black pixels determine, at every selection of the objective pixel, whether the objective pixel serving as the first pixel corresponding to the first color determination pixel and the second pixel corresponding to the second color determination pixel is the black pixel,
wherein the determining execution of trapping processes includes:
  determining to execute a first trapping process to add a color component of the first color determination pixel to the objective pixel when the first color determination pixel is determined to have the chromatic color and the objective pixel is determined to be a black pixel; and
  determining to execute a second trapping process to add a color component of the second color determination pixel to the objective pixel when the second color determination pixel is determined to have the chromatic color, the objective pixel is determined to be the black pixel and the first color determination pixel located between the second color determination pixel and the objective pixel is determined to be the black pixel.

13. The image processing apparatus according to claim 12,
wherein the sequentially selecting a plurality of pixels sequentially selects the plurality of surrounding pixels within the determination area in accordance with a particular order.

14. An image processing apparatus, comprising:
a buffer configured to temporarily store image data; and
a controller,
wherein the controller is configured to execute:
receiving image data configured such that a plurality of pixel arrays each including a plurality of pixels are arranged in a main scanning direction, the plurality of pixel arrays being aligned in a sub scanning direction which is perpendicular to the main scanning direction;
setting, in the image data, an area including three or more lines of pixels aligned in a sub scanning direction, each line includes a particular number, which is three or more, of pixels aligned in a main scanning direction as a determination area;
sequentially selecting a plurality of pixels within the determination area as color determination pixels;
determining, referring to the buffer, whether a color determination pixel of the selected color determination pixels has a chromatic color;
determining, referring to the buffer, black pixels including:
  determining whether a first pixel adjacent to the color determination pixel is black; and
  determining whether a second pixel apart from the color determination pixel with one or more intermediate pixels therebetween is black;
determining execution of trapping processes including:
  determining that a first trapping process to add a color component of the color determination pixel to the first pixel is to be executed when the controller determines that the color determination pixel has a chromatic color and the first pixel is black; and
  determining that a second trapping process to add the color component of the color determination pixel to the second pixel is to be executed when it is determined that the color determination pixel has a chromatic color, the second pixel is black, and the intermediate pixels located between the color determination pixel and the second pixel are black;
executing trapping processes including:
  executing the first trapping process on a pixel on which the first trapping process is determined to be executed; and
  executing the second trapping process on a pixel on which the second trapping process is determined to be executed;
restricting execution of trapping processes including:
  restricting execution of the second trapping process on the pixel on which the first trapping process is determined to be executed,
wherein a position of the second pixel within the determination area varies depending on the color determination pixel,
wherein the setting updates the determination area by setting a plurality of areas of the image data as the determination area sequentially in accordance with reception of the image data,
wherein the buffer includes:
  an area buffer having a buffer size corresponding to the determination area, the area buffer storing image data of pixel group within the determination area set by the setting among a plurality of pixels the image data has;
  a plurality of line buffers the number of which is less than the number of lines by one, the plurality of line buffers storing image data of a pixel group outside the determination area among the plurality of pixels the image data has and supposed to be set as the determination area again when the determination area is updated by the setting, and
wherein a position of the second pixel in the determination area varies depending on the color determination pixel as selected.

15. A non-transitory computer-readable recording medium storing instructions to control an image processing apparatus having a storage configured to store image data and a controller,
wherein the instructions cause, when executed by the controller, the image processing apparatus to execute:
  receiving image data configured such that a plurality of pixel arrays each including a plurality of pixels are arranged in a main scanning direction, the plurality of pixel arrays being aligned in a sub scanning direction which is perpendicular to the main scanning direction;
  setting a determination area having a particular number of pixels within a particular area of three lines or more in the sub scanning direction and three pixels or more in the main scanning direction;
  sequentially selecting a plurality of pixels within the determination area as color determination pixels;
  determining whether a color determination pixel of the selected color determination pixels has a chromatic color;
  determining whether a first pixel adjacent to the color determination pixel is black;
  determining whether a second pixel apart from the color determination pixel with one or more intermediate pixels therebetween is black;
  determining that a first trapping process to add a color component of the color determination pixel to the first pixel is to be executed when the controller determines that the color determination pixel has a chromatic color and the first pixel is black;
  determining that a second trapping process to add the color component of the color determination pixel to the second pixel is to be executed when it is determined that the color determination pixel has a chromatic color, the second pixel is black, and the intermediate pixels located between the color determination pixel and the second pixel are black;
  executing the first trapping process on a pixel on which the first trapping process is determined to be executed;
  executing the second trapping process on a pixel on which the second trapping process is determined to be executed; and
  restricting execution of the second trapping process on the pixel on which the first trapping process is determined to be executed,
wherein a position of the second pixel within the determination area varies depending on the color determination pixel.

* * * * *

UNITED STATES PATENT AND TRADEMARK OFFICE
CERTIFICATE OF CORRECTION

| | | |
|---|---|---|
| PATENT NO. | : 10,457,068 B2 | Page 1 of 1 |
| APPLICATION NO. | : 15/938523 | |
| DATED | : October 29, 2019 | |
| INVENTOR(S) | : Yuji Sato | |

It is certified that error appears in the above-identified patent and that said Letters Patent is hereby corrected as shown below:

In the Claims

Column 26, Claim 5, Line 9:
Delete "pixel." and insert --pixel; and--

Column 26, Claim 5, Line 10:
Insert --determining whether a third pixel sandwiching, in association with the color determination pixel, the first pixel and the second pixel is the black pixel.--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*